US007667685B2

(12) United States Patent
Yamada et al.

(10) Patent No.: US 7,667,685 B2
(45) Date of Patent: Feb. 23, 2010

(54) OPERATIONS PANEL AND IMAGE FORMING APPARATUS

(75) Inventors: Kenichi Yamada, Kanagawa (JP); Kazuo Koike, Kanagawa (JP); Tasuku Kohara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 637 days.

(21) Appl. No.: 10/593,313

(22) PCT Filed: Feb. 2, 2006

(86) PCT No.: PCT/JP2006/302208

§ 371 (c)(1),
(2), (4) Date: Sep. 18, 2006

(87) PCT Pub. No.: WO2006/087960

PCT Pub. Date: Aug. 24, 2006

(65) Prior Publication Data

US 2009/0201527 A1    Aug. 13, 2009

(30) Foreign Application Priority Data

Feb. 16, 2005    (JP) .............................. 2005-039020

(51) Int. Cl.
*G09G 5/00* (2006.01)
(52) U.S. Cl. ..................... 345/156; 399/81; 358/1.15
(58) Field of Classification Search ......... 345/156–184, 345/204, 211–213; 399/75–90, 8, 183, 185; 358/1.13–1.16
See application file for complete search history.

(56) References Cited

U.S. PATENT DOCUMENTS 6,243,682 B1     6/2001    Eghtesadi et al.
7,030,862 B2 *   4/2006    Nozaki ........................ 345/173
7,173,724 B2 *   2/2007    Nomura et al. ............. 358/1.15
7,176,898 B2 *   2/2007    Litwiller ..................... 345/173
7,366,436 B2 *   4/2008    Akiyama et al. .............. 399/81
2003/0063269 A1  4/2003    Nozaki
2004/0061677 A1  4/2004    Hejza Litwiller

FOREIGN PATENT DOCUMENTS

| JP | 7 99553   | 4/1995  |
| JP | 07 261904 | 10/1995 |
| JP | 8 65424   | 3/1996  |
| JP | 11 065478 | 3/1999  |

(Continued)

*Primary Examiner*—Jimmy H Nguyen
(74) *Attorney, Agent, or Firm*—Oblon, Spivak, McClelland, Maier & Neustadt, L.L.P.

(57) ABSTRACT

An operations panel is disclosed that comprises plural operations blocks attached to a main body of an electronic apparatus; a selection information output unit that outputs a selection information item indicating a selection item selected in the operations block; a display operations block that is removably attachable to the main body, including a display unit that shows display selection items used for selecting operational functions, a selection detecting unit that detects the selected display selection item, and a display control unit that causes the display unit to show the selection items corresponding to the operations blocks together with the display selection item when the display operations block is removed from the main body; and a selection information retrieving unit that retrieves, as the selection information item, a selection result detected by the selection detecting unit of the display operations block removed from the main body.

9 Claims, 22 Drawing Sheets

FOREIGN PATENT DOCUMENTS

| | | |
|---|---|---|
| JP | 2000 149528 | 5/2000 |
| JP | 2003 94764 | 4/2003 |
| JP | 2003 345500 | 12/2003 |
| JP | 2004021155 A * | 1/2004 |
| JP | 2004 101836 | 4/2004 |
| JP | 2004 312096 | 11/2004 |

* cited by examiner

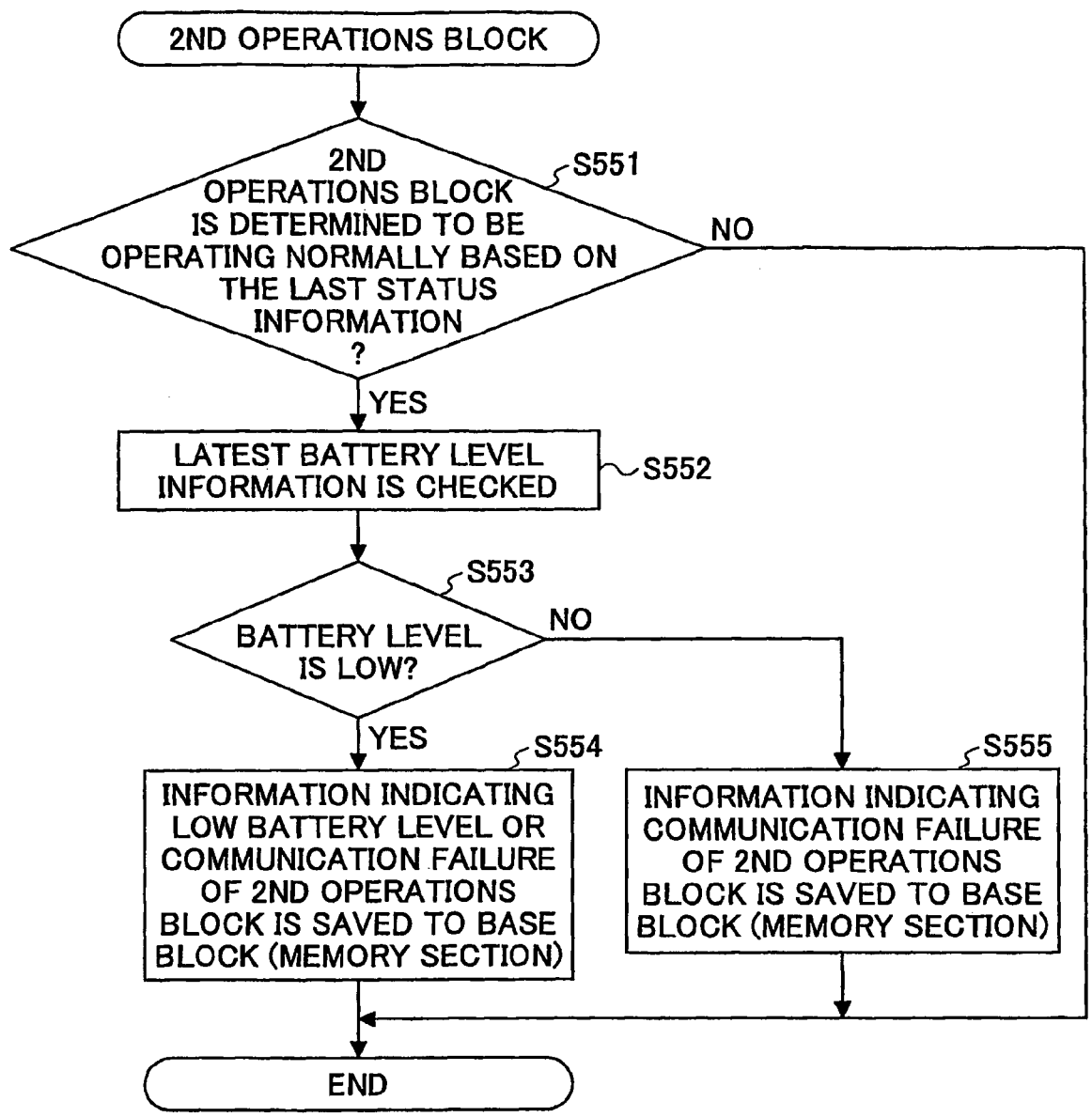

FIG.18

| 1ST OPERATIONS BLOCK | 2ND OPERATIONS BLOCK | 3RD OPERATIONS BLOCK | OPERATIONS | REPORTS TO USERS | REPORTING METHOD |
|---|---|---|---|---|---|
| O | × | O | BASIC OPERATIONS ARE AVAILABLE | FAILURE OF DISPLAY OPERATIONS BLOCK IS INDICATED BY BASE BLOCK | LED DISPLAY ETC. |
| O | × | × | NO OPERATIONS ARE AVAILABLE | FAILURES OF DISPLAY OPERATIONS BLOCK AND 2ND OPERATIONS BLOCK ARE INDICATED BY BASE BLOCK | LED DISPLAY ETC. |
| × | × | O | ONLY SIMPLE COPY OPERATION IS AVAILABLE | FAILURES OF DISPLAY OPERATIONS BLOCK AND 1ST OPERATIONS BLOCK ARE INDICATED BY BASE BLOCK | LED DISPLAY ETC. |
| × | × | × | NO OPERATIONS ARE AVAILABLE | FAILURES OF DISPLAY OPERATIONS BLOCK AND 1ST AND 2ND OPERATIONS BLOCKS ARE INDICATED BY BASE BLOCK | LED DISPLAY ETC. |
| O | O | O | NORMAL OPERATIONS | — | LCD, LED DISPLAY ETC. |
| O | O | × | FUNCTIONS OF 2ND OPERATIONS BLOCK ARE INCORPORATED INTO DISPLAY OPERATIONS BLOCK | FAILURE OF 2ND OPERATIONS BLOCK IS INDICATED BY DISPLAY OPERATIONS BLOCK AND BASE BLOCK | LCD, LED DISPLAY ETC. |
| × | O | O | FUNCTIONS OF 1ST OPERATIONS BLOCK ARE INCORPORATED INTO DISPLAY OPERATIONS BLOCK | FAILURE OF 1ST OPERATIONS BLOCK IS INDICATED BY DISPLAY OPERATIONS BLOCK AND BASE BLOCK | LCD, LED DISPLAY ETC. |
| × | O | × | FUNCTIONS OF 1ST AND 2ND OPERATIONS BLOCKS ARE INCORPORATED INTO DISPLAY OPERATIONS BLOCK | FAILURES OF 1ST AND 2ND OPERATIONS BLOCKS ARE INDICATED BY DISPLAY OPERATIONS BLOCK AND BASE BLOCK | LCD, LED DISPLAY ETC. |

OPERATIONS PANEL AND IMAGE FORMING APPARATUS

TECHNICAL FIELD

The present invention generally relates to an operations panel and an image forming apparatus, and particularly relates to an operations panel having operations blocks for remotely controlling an electronic apparatus, such as an electrophotographic image forming apparatus, and an image forming apparatus having the operations panel.

BACKGROUND ART

Electronic apparatuses, such as copying machines, fax machines, printers, and multifunction machines, include operations sections as user interfaces, which are configured such that users can easily use many functions. Most of the operations sections are fixed to main bodies of the electronic apparatuses. The users use the operations sections according to operating procedures shown on the operations sections or display sections of control panels or the like.

In recent years, in order to facilitate use by wheelchair users or in order to avoid reflection of ceiling light and the like, there have been proposed operations sections that have complex mechanisms, such as tilt mechanisms, to allow angle adjustment and changing of the position thereof, and operations sections that can be removed from the apparatus bodies and be used as remote controllers.

Patent Document 1 discloses an operations panel that includes at least one removable operations block replaceable by another operations block. According to Patent Document 1, if the position of the removable operations block is not convenient for a desired operation, the removable operations block can be replaced with another operations block, thereby eliminating the need for replacing the operations panel itself.

Patent Document 2 discloses an image forming apparatus that includes a remote operations section that is removably attached to the apparatus body and can be used as a remote controller. Since this image forming apparatus can be remotely controlled by the remote operations section removed from the apparatus body when needed, various types of users can easily use the image forming apparatus.

<Patent Document 1> Japanese Patent Laid-Open Publication No. 2000-149528

<Patent Document 2> Japanese Patent Laid-Open Publication No. 2004-101836

However, in both cases, when the operations section is removed from the apparatus body and used as a remote controller, the image forming apparatus can be operated by only the user with the removed operations section but not other users. Such a configuration is not suitable for an apparatus used by many users. Moreover, if the removable operations section only has a part of the operational functions, the functions that can be used from the removed operations section are limited. This makes it difficult to improve operability of the operations panel. Providing the removable operations section with all the operational functions may be a solution. However, the removable operations sections having all the operational functions would be large in size.

DISCLOSURE OF THE INVENTION

The present invention may solve at least one problem described above.

In view of the foregoing, the present invention may improve operability of an operations panel that is removably attachable to an electronic apparatus and can be used in a position removed from the electronic apparatus.

According to an embodiment of the present invention, there is provided an operations panel that comprises plural operations blocks that are attached to a main body of an electronic apparatus and are used for selecting selection items corresponding to operational functions of the electronic apparatus; a selection information output unit that outputs a selection information item indicating the selection item selected in the operations block; a display operations block that is removably attachable to the main body, including a display unit that shows display selection items used for selecting the operational functions, a selection detecting unit that detects the selected display selection item shown by the display unit, and a display control unit that causes the display unit to show the selection items corresponding to the operations blocks together with the display selection item when the display operations block is removed from the main body; and a selection information retrieving unit that retrieves, as the selection information item, a selection result detected by the selection detecting unit of the display operations block removed from the main body; wherein the selection information output unit outputs the selection information item retrieved by the selection information retrieving unit to the electronic apparatus.

When the display operations block of the above-described operations panel is used in a position removed from the main body of the electronic apparatus, the display operations panel shows the selection items corresponding to the operations blocks remaining on the main body so as to allow users to select any of the selection items. Then, a selection information item indicating the selection result is retrieved from the display operations block and output to the electronic apparatus. That is, when the display operations block is removed from the main body of the electronic apparatus and used as a remote controller, all the functions of the operations blocks remaining on the main body can be used from the display operations block. Therefore, the operability of the operations panel that can be used in a position removed from the main body of the electronic apparatus is improved. Moreover, the above-described operations panel can realize barrier-free use of the electronic apparatus without limiting the functions of the electronic apparatus. For example, wheelchair users can use all the functions of the electronic apparatus in a position convenient to them with use of the display operations block removed from the main body. The operations panel can also avoid reflection of light more easily compared to the related-art operations panels having conventional installation angle adjusting functions.

The above-described operations panel is preferably configured such that the display control unit of the display operations block causes the display unit to not show the selection item corresponding to the operations block in which occurrence of a failure is detected by a failure detecting unit when the display operations block is removed from the main body.

With this configuration, the need for showing an abnormality indication on the display operations block in response to an operation request is eliminated. The processing performed in the display operations block is thus simplified, thereby improving operational performance in the display operations block.

BRIEF DESCRIPTION OF THE DRAWINGS

FIG. 17 is a flowchart showing an example of processing performed in an operations panel when a second operations block is in an abnormal situation; and FIG. 18 is a table showing a relationship between failures in an operations panel, operations, and reporting methods.

BEST MODE FOR CARRYING OUT THE INVENTION

The following provides examples of preferred embodiments wherein an operations panel of the present invention is configured to be removably attachable to an image forming apparatus such as, e.g., a multifunction machines integrating a copying machine, a fax machine, and a printer. It should be understood that the image forming apparatus is not limited to an electronic apparatus disclosed in the following embodiments, but may be any electronic apparatus having an operations panel a part of which is removable to be used as a remote controller.

Figure 1:
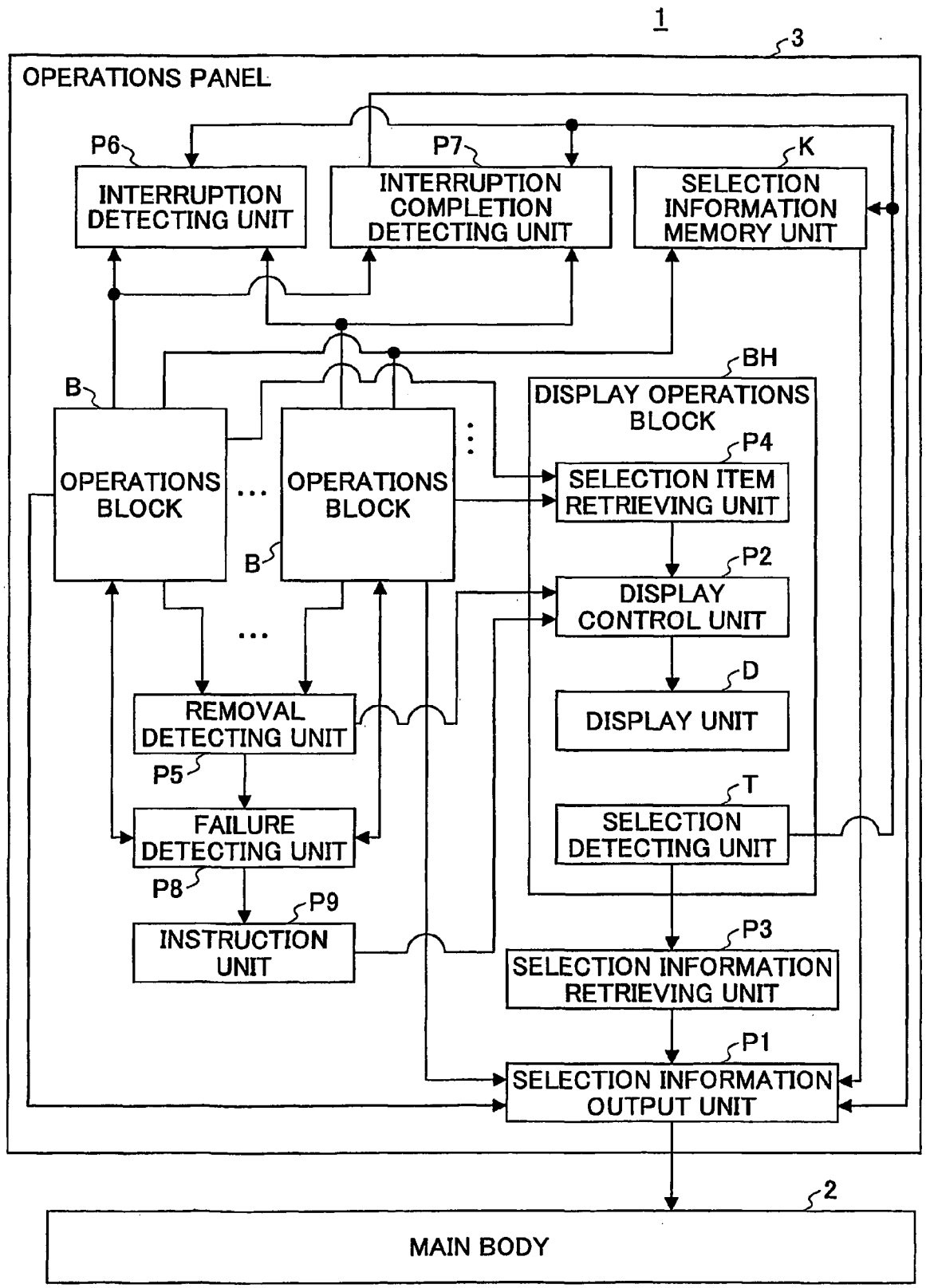
FIG. 1 is a block diagram illustrating basic configurations of an operations panel and an image forming apparatus according to an embodiment of the present invention.
Figure 2A:
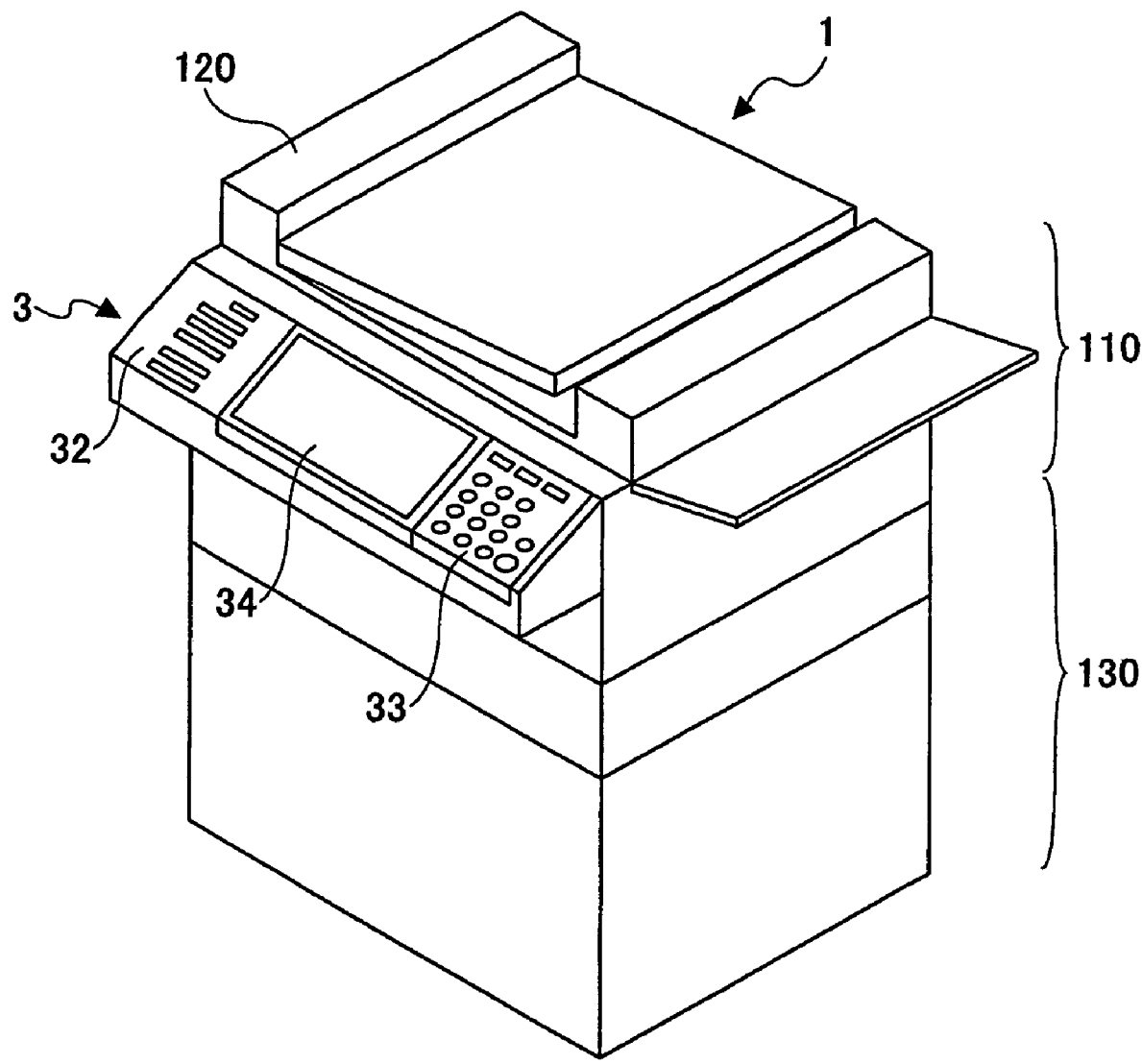
FIG. 2A is a perspective view illustrating an example of an image forming apparatus according to an embodiment of the present invention.
Figure 2B:
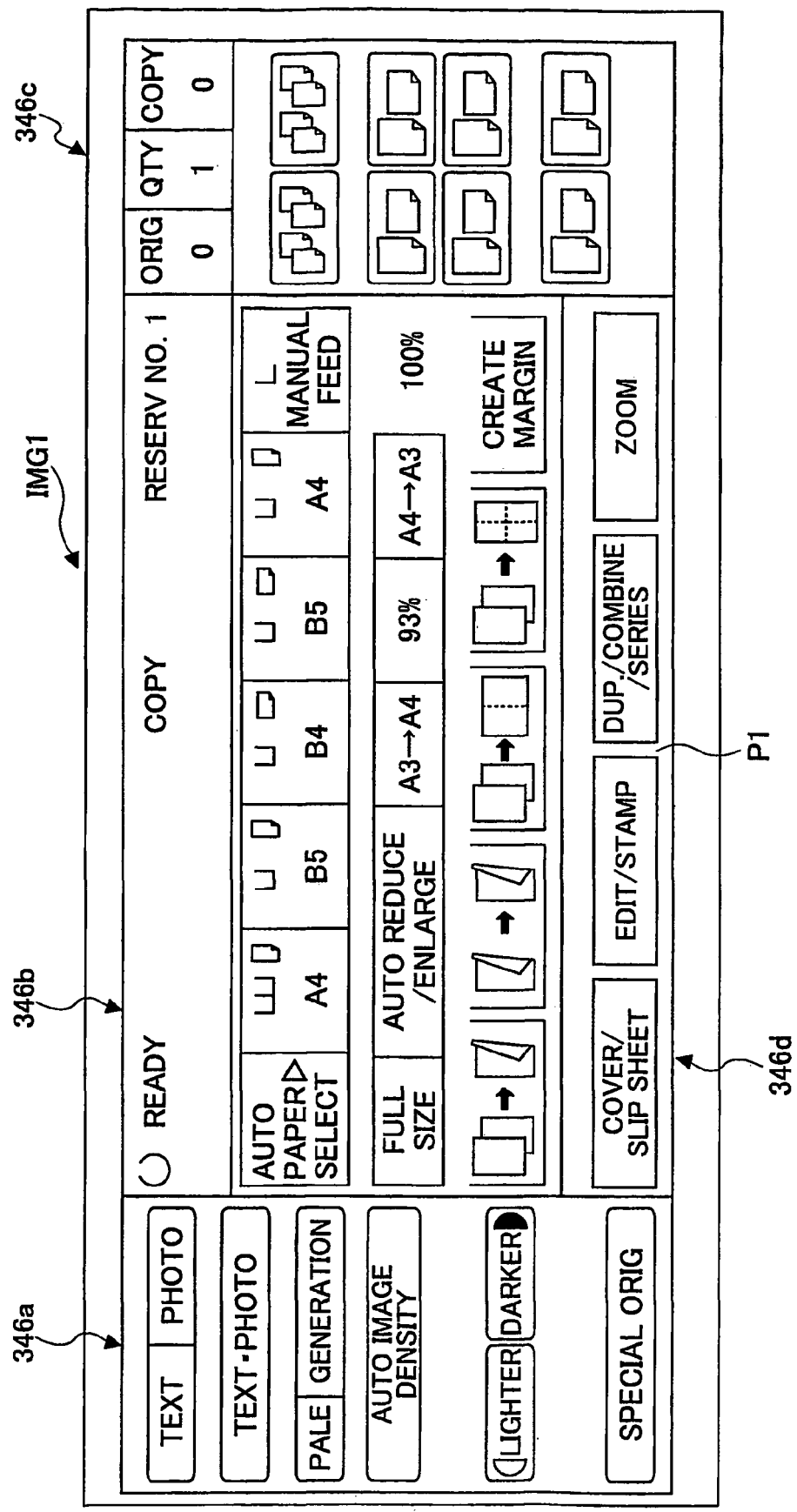
FIG. 2B illustrates an example of a screen shown on a display operations section of the image forming apparatus of FIG. 2A.

FIG. 2A is an external view illustrating an example of an image forming apparatus 1 according to an embodiment of the present invention. FIG. 2B shows an example of a screen shown on a display operations block 34 of the image forming apparatus 1 of FIG. 2A. With reference to FIG. 2A, the image forming apparatus 1, which is well known in the art, comprises an image forming unit 110, an auto document reader unit 120, and a sheet storage unit 130. For example, the image forming apparatus 1 transfers and fixes a toner image, using electrographic technology, to a sheet supplied from the sheet storage unit 130 based on image information of an original document read by the auto document reader unit 120, and discharges the sheet with the toner image from a discharge section (not shown).

An operations panel 3, with which users operate the image forming apparatus 1, is provided at the front side of the image forming apparatus 1. The operations panel 3 comprises first and second operations blocks 32 and 33 each having plural operations switches, and the display operations block 34 that shows display selection items used for selecting an operational function of the image forming apparatus 1.

Figure 3:
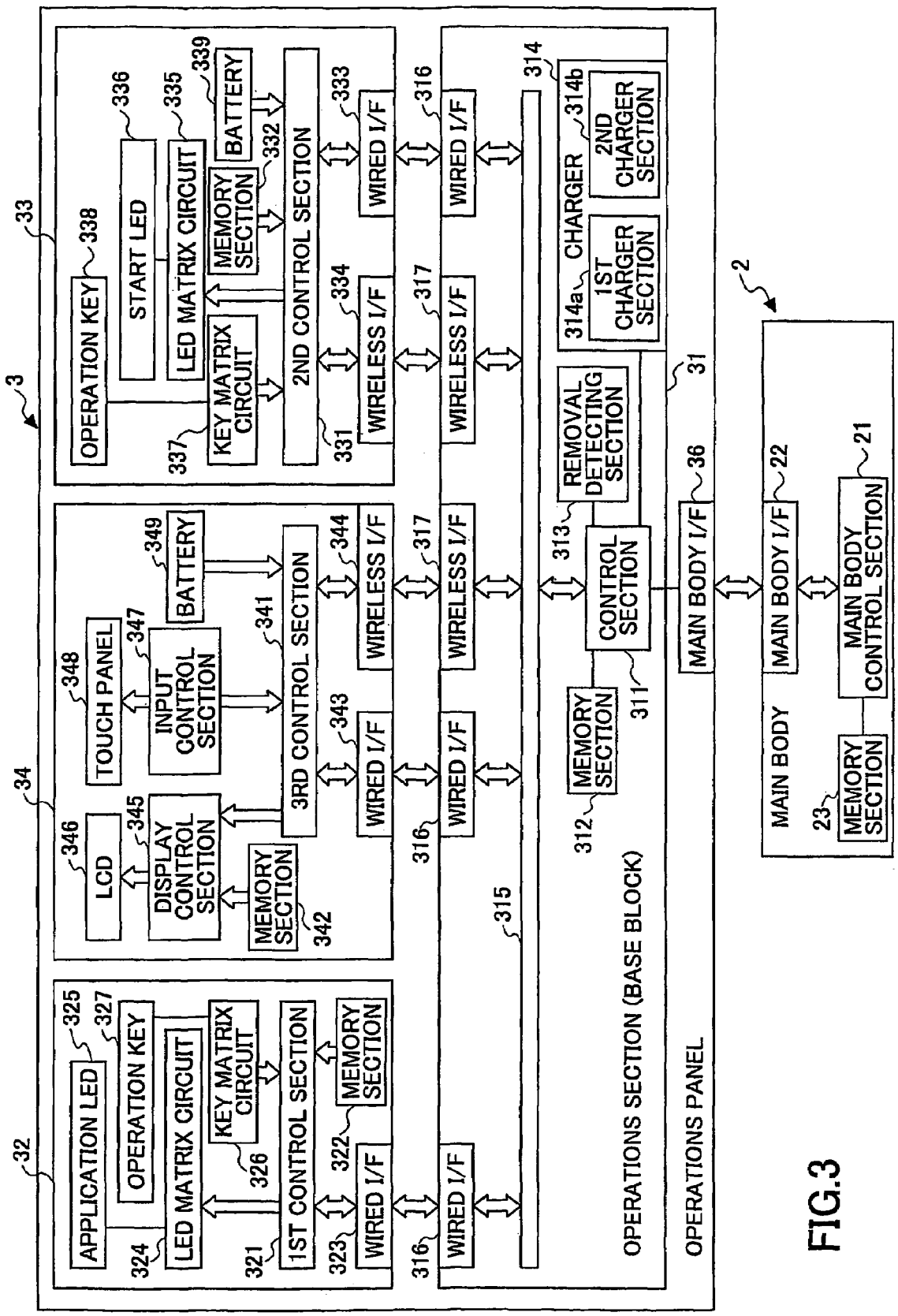
FIG. 3 is a schematic block diagram illustrating a configuration of an operations panel of the image forming apparatus of FIG. 2A.

FIG. 3 is a schematic block diagram illustrating a configuration of the operations panel 3 of the image forming apparatus 1 of FIG. 2A. With reference to FIG. 3, a main body 2 of the image forming apparatus 1 comprises a main body control section 21 for controlling operational functions of the image forming apparatus 1. The main body control section 21 is connected to a memory section 23 for storing various information items. The main body control section 21 sends and receives serial signals and the like for controlling the operations panel 3 via a main body interface 22. When a user selects one of available operational functions of the image forming apparatus 1 in the operations panel 3, the main body control section 21 controls operations according to a selection information item indicating the selected operational function, e.g., a copy function.

The operations panel 3 further comprises a base block 31 and a main body interface 36, in addition to the first and second operations blocks 32 and 33 and the display operations block 34. While the operations panel 3 includes two operations blocks 32 and 33 in this embodiment, the operations panel may include three or more operations blocks. Further, the three or more operations blocks may be arranged in various different ways.

The base block 31 comprises a control section 311, a memory section 312, a removal detecting section 313, and a charger 314, etc. The control section 311 is connected to the memory section 312, the removal detecting section 313, the charger 314, and the main body interface 36.

The control section 311 comprises a central processing unit (not shown), a large-scale integrated circuit (LSI) (not shown), and a digital signal processor (DSP) (not shown), etc., which are well known in the art. The control section 311 decodes the serial signals input from the main body control section 21 so as to control the operations blocks 32-34 according to the decoded result. The control section 311 also reads input signals from the operations blocks 32-34 and converts the input signal into main body serial signals. The control section 311 controls whether to allow or suspend power supplied from the charger 314 to the second operations block 33 and the display operations block 34 depending on whether the second operations block 33 and the display operations block 34 are removed. The mounting or removal of the second operations block 33 and the display operations block 34 is detected by the removal detecting section 313 (removal detecting unit), which includes a contact switch and a sensor (neither shown), etc.

The control section 311 is connected to wired interfaces 316 corresponding to the first operations block 32, the second operations block 33, and the display operations block 34, and to wireless interfaces 317 corresponding to the second operations block 33 and the display operations block 34, via a bus 315. For example, the first operations block 32 is provided with only the wired interface 316 because the first operations block 32 is fixed to the main body 2. On the other hand, each of the second operations block 33 and the display operations block 34 is provided with the wired interfaces 316 and the wireless interface 317 because the second operations block 33 and the display operations block 34 are removably attached to the main body 2.

When the control section 311 inputs and outputs various signals to and from the operations blocks 32-34, the wired interfaces 316 are used if the removal detecting section 313 detects that the second operations block 33 and the display operations block 34 are attached to the main body 2. On the other hand, the wireless interfaces 317 are used if the removal detecting section 313 detects that the second operations block 33 and the display operations block 34 are removed from the main body 2.

The charger 314 comprises a first charger section 314*a* for supplying power to the second operations block 33, and a second charger section 314*b* for supplying power to the display operations block 34. The control section 311 causes the first charger section 314*a* to supply power to the second operations block 33 when the removal detecting section 313 detects that the second operations block 33 is attached to the main body 2, and causes the second charger section 314*b* to supply power to the display operations block 34 when the removal detecting section 313 detects that the display operations block 34 is attached to the main body 2.

The first operations block 32, which is fixed to the main body 2, comprises a first control-section 321 including a CPU (not shown), etc., and operates according to various programs stored in an internal storage medium (not shown) and the like. The first control section 321 writes data into and reads data from a memory section 322. The first control section 321 also decodes signals input from the base block 31 via a wired interface 323 and controls an LED matrix circuit 324 so as to control turning on/off of LEDs 325 corresponding to a copy application and a reservation application, etc., in the image forming apparatus 1.

Moreover, the first control section 321 decodes inputs from a key matrix circuit 326 so as to identify operations with operation keys 327 in response to a key information request, etc., from the base block 31, and outputs the decoded result as a selection information item to the control section 311 of the base block 31.

The second operations block 33, similarly to the first operations block 32, comprises a second control section 331 including a CPU (not shown), etc. The second control section 331 writes data into and reads data from a memory section 332. The second control section 331 also decodes signals input from the base block 31 via a wired interface 333 or a wireless interface 334 and controls an LED matrix circuit 335 so as to control turning on/off of a start LED 336 corresponding to a start key, etc.

Moreover, the second control section 331 decodes inputs from a key matrix circuit 337 so as to identify operations with operation keys 338 including numeric keys and an interruption key, etc., in response to a key information request, etc., from the base block 31, and outputs the decoded result as a selection information item to the control section 311 of the base block 31.

The second control section 331 determines whether to use a battery 339 to supply operating power to the second operations block 33 based on battery level or the like of the wired interface 333 so as to control switching of the battery 339, and switches between the wired interface 333 and the wireless interface 334. These switching operations may be automatically performed with the use of a circuit.

The display operations block 34, which is removably attached to the main body 2, comprises a third control section 341 including a CPU, etc., and operates according to various programs stored in an internal storage medium (not shown) and the like. The third control section 341 writes data into and reads data from a memory section 342. The third control section 341 also decodes signals input from the base block 31 via a wired interface 343 or a wireless interface 344 and controls a display control section 345 so as to selectively show various information items held in the memory section 342 and various information items sent from the base block 31 on an LCD 346 (display unit).

The third control section 341 transmits a touch panel positional information item (described below) of a touch panel 348 (selection detecting unit) from an input control section 347 to the control section 311 as a selection information item in response to a positional information request of the touch panel 348 from the control section 311. In this embodiment, the LCD 346 and the touch panel 348 are arranged in a superposed relationship. The LCD 346 shows text/images under the control of the display control section 345 according to instructions from the third control section 341. A position pressed on the touch panel 348 is detected as a coordinate position on a display screen by the input control section 347 such that the touch panel positional information item indicating the detected coordinate position is output from the input control section 347 to the third control section 341.

The third control section 341, similarly to the second control section 331 of the second operations block 33, determines whether to use a battery 349 to supply operating power to the display operations block 34 based on battery level or the like of the wired interface 343 so as to control switching of the battery 349, and switches between the wired interface 343 and the wireless interface 344. These switching operations may be automatically performed with use of a circuit.

Figure 4A:
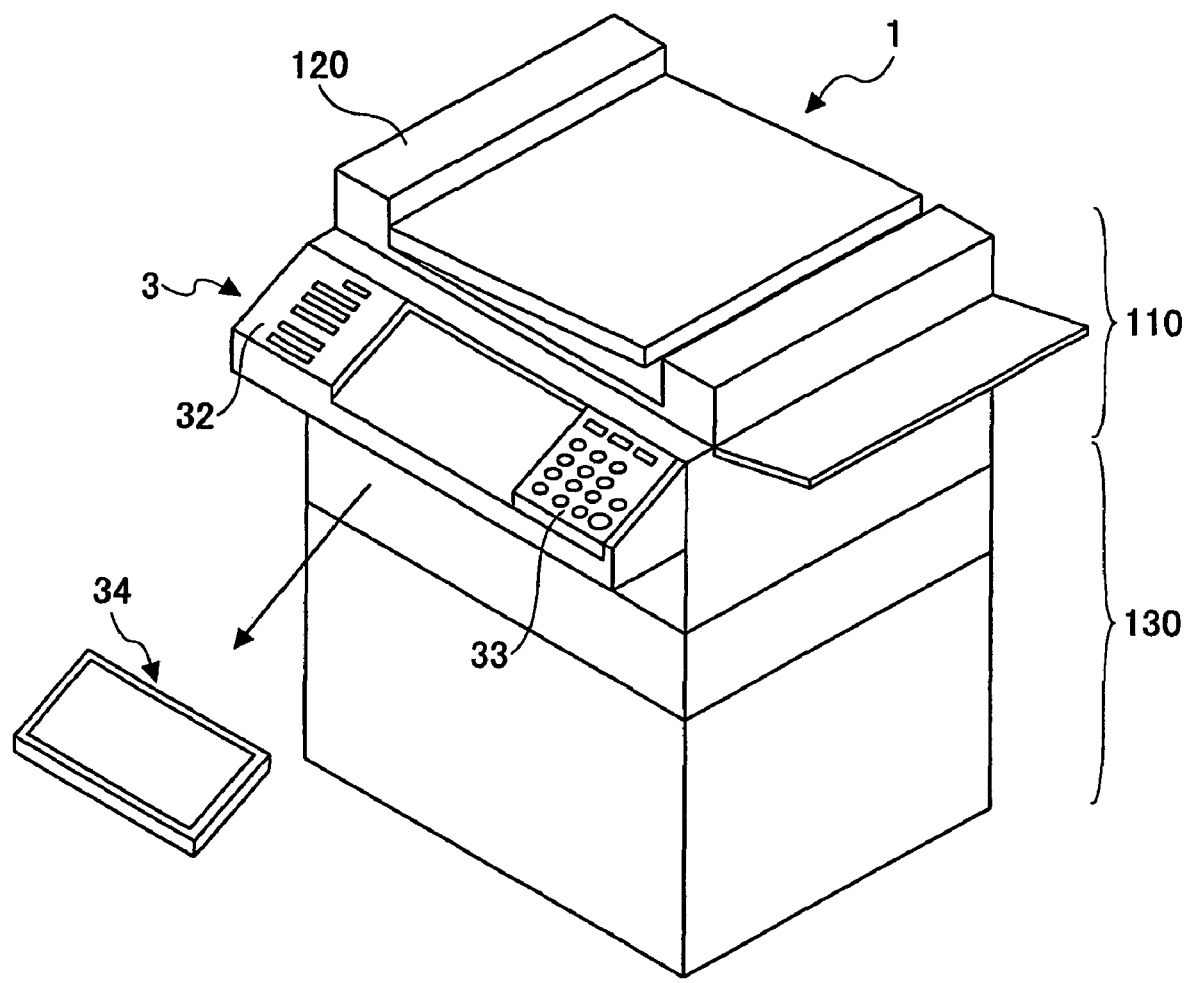
FIG. 4A shows an example of an image forming apparatus with a display operations block removed from a main body of the image forming apparatus.
Figure 4B:
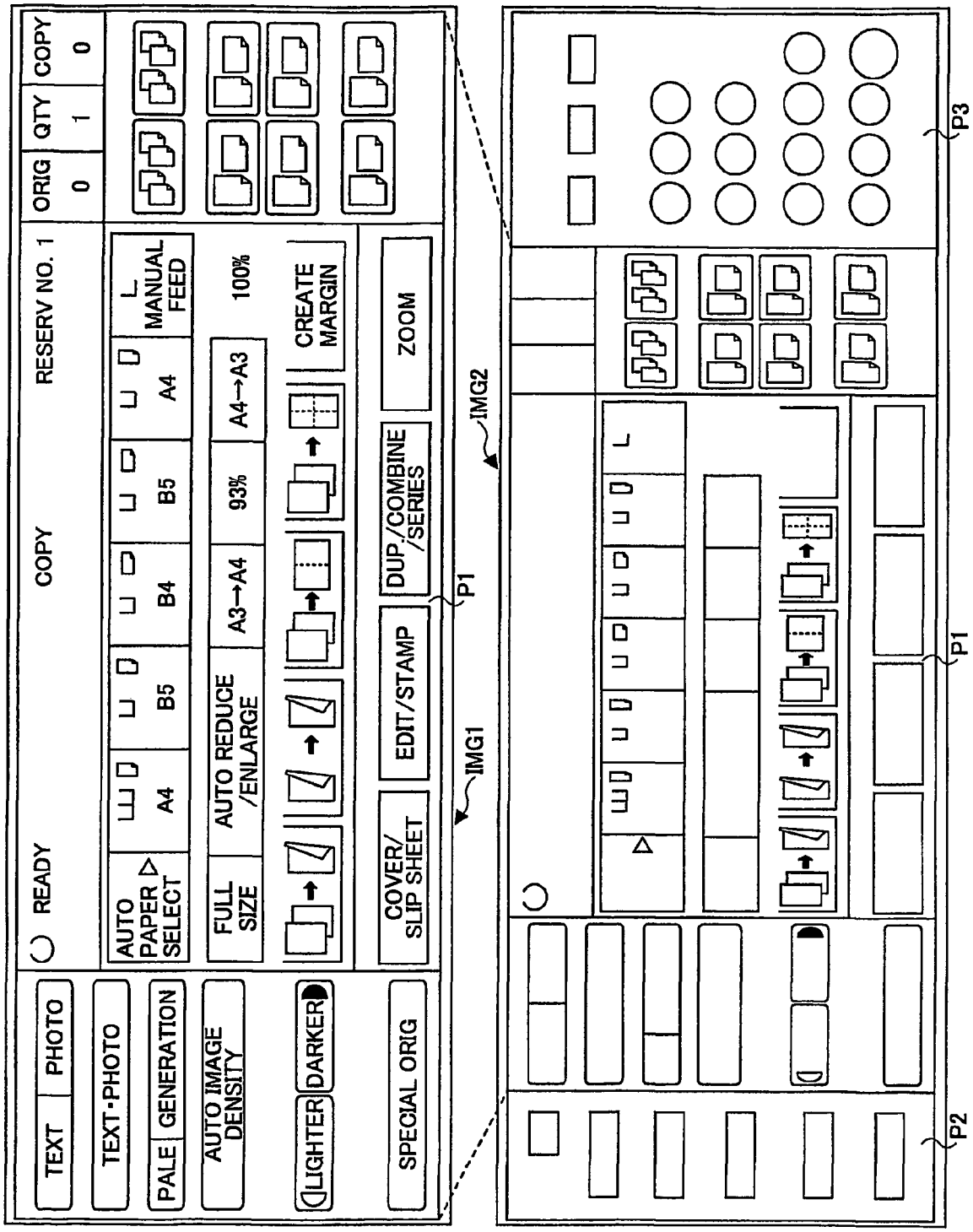
FIG. 4B illustrates an example of a screen shown when a display operations block is removed.
Figure 5A:
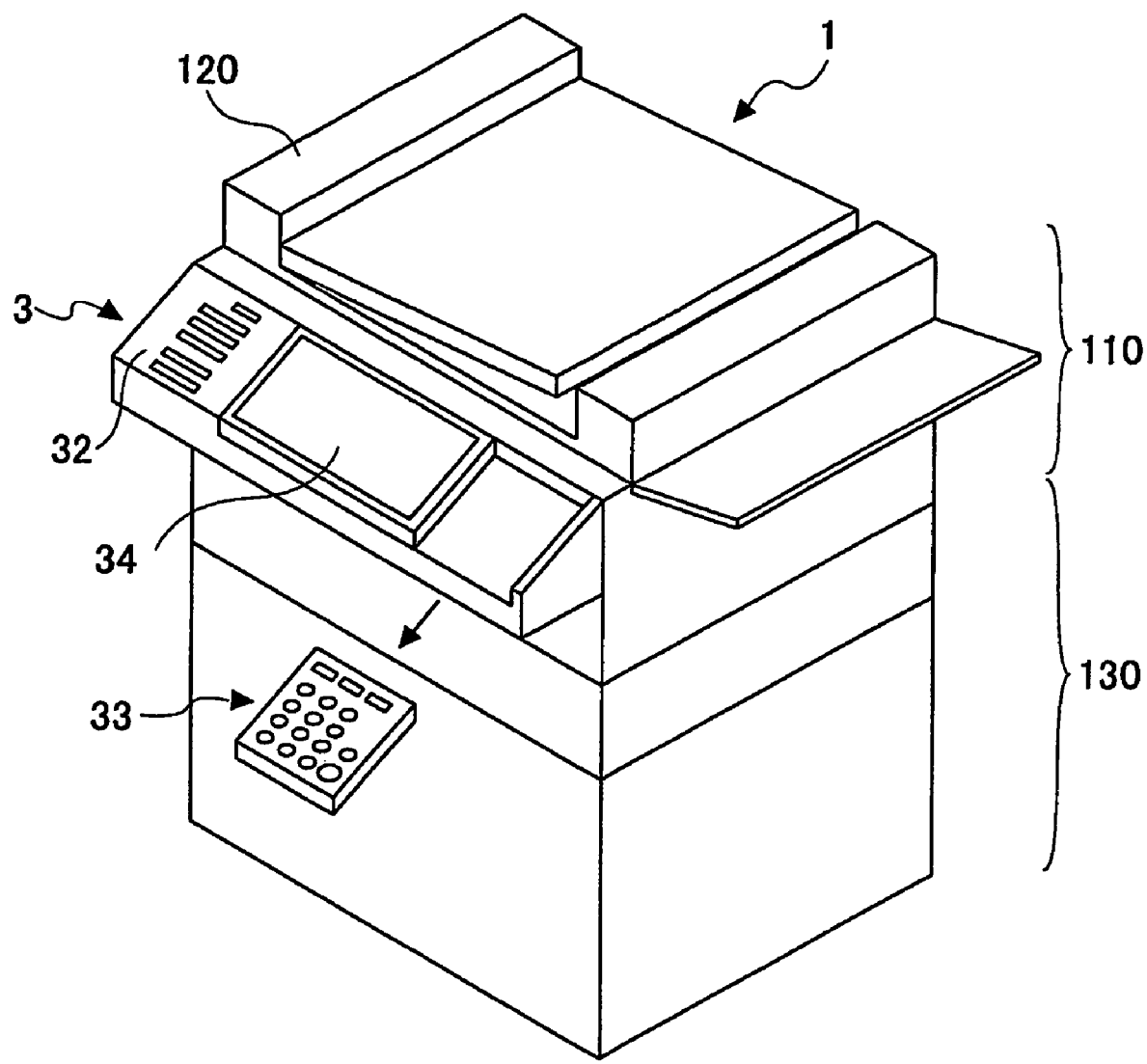
FIG. 5A shows an example of an image forming apparatus with a second operations block removed from a main body of the image forming apparatus.
Figure 5B:
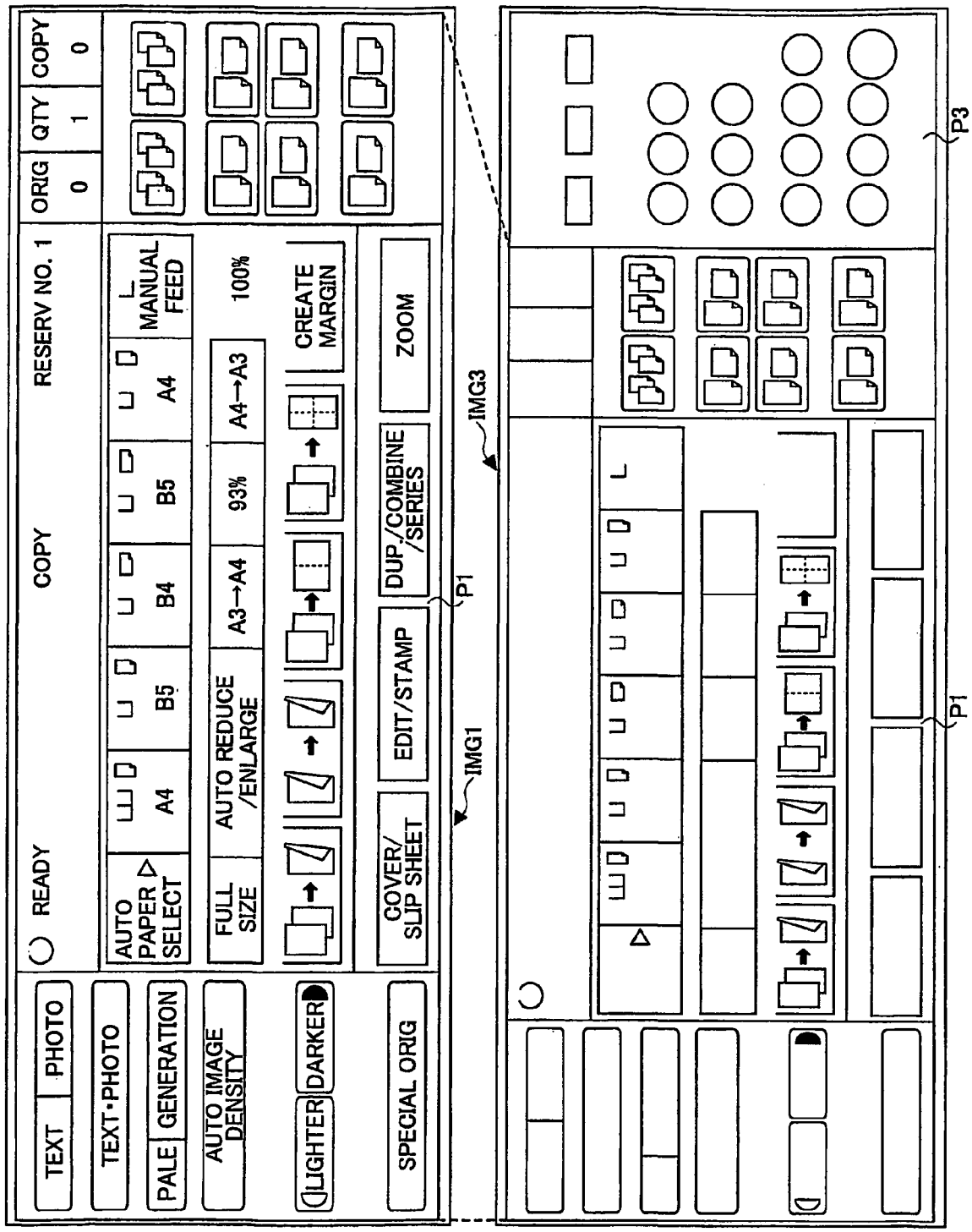
FIG. 5B illustrates an example of a screen shown on a display operations block when a second operations block is removed.

The following describes examples of the display selection items shown on the LCD 346 with reference to FIGS. 2B, 4A, 4B, 5A, and 5B. FIG. 4A shows an example of the image forming apparatus 1 with the display operations block 34 removed from the main body 2 of the image forming apparatus 1. FIG. 4B illustrates an example of a screen shown when the display operations block 34 is removed. FIG. 5A shows an example of the image forming apparatus 1 with the second operations block 33 removed from the main body 2 of the image forming apparatus 1. FIG. 5B illustrates an example of a screen shown on the display operations block 34 when the second operations block 33 is removed.

When the second operations block 33 and the display operations block 34 are attached to the main body 2, a first display screen IMG1 of FIG. 2B for copying operations in the image forming apparatus 1 appears, which includes a first display section P1 having a first area 346a for selecting the type of original documents, the image density, and options for feeding original documents, a second area 346b showing status and messages, a third area 346c showing the number of original documents read into a memory, the number of sheets or copies to be printed, and the number of sheets already printed, and a fourth area 346d showing function items of the image forming apparatus 1, etc.

When the display operations block 34 is removed from the main body 2 as shown in FIG. 4A, a second display screen IMG2 of FIG. 4B appears, which includes the first display section P1, a second display section P2 showing selection items corresponding to the first operations block 32, and a third display section P3 showing selection items corresponding to the second operations block 33.

Although the second display screen IMG2 includes the first display section P1 reduced in its width direction and the second display section P2 and the third display section P3 one on each side of the first display section P1 in this embodiment, the layout in the second display screen IMG2 may be changed. For example, the items shown in the first display section P1 may be replaced by the selection items shown in the second display section P2 or by the selection items shown in the third display section P3.

When the second operations block 33 is removed from the main body 2 as shown in FIG. 5A, a third display screen IMG3 of FIG. 5B appears, which includes the first display section P1 and the third display section P3 showing the selection-items corresponding to the second operations block 33. In the third display screen IMG3, the third display section P3 is shown at the right side of the first display section P1 according to the positional relationship of the second operations block 33 with respect to the display operations block 34, thereby preventing users of the image forming apparatus 1 from feeling that something strange is happening.

Figure 6:
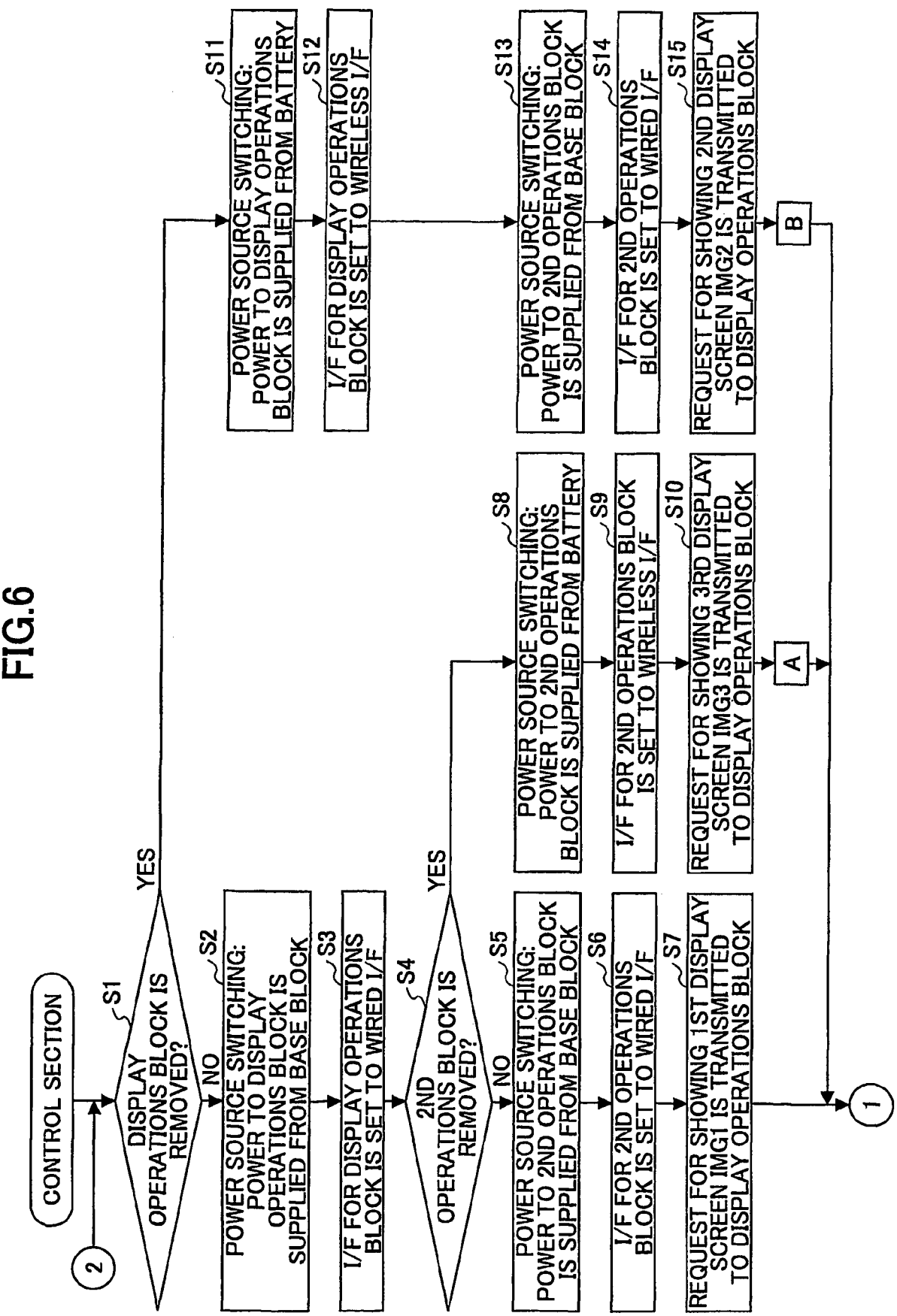
FIG. 6 is a flowchart showing processing performed by a control section of a base block of FIG. 3 according to an embodiment of the present invention.
Figure 7:
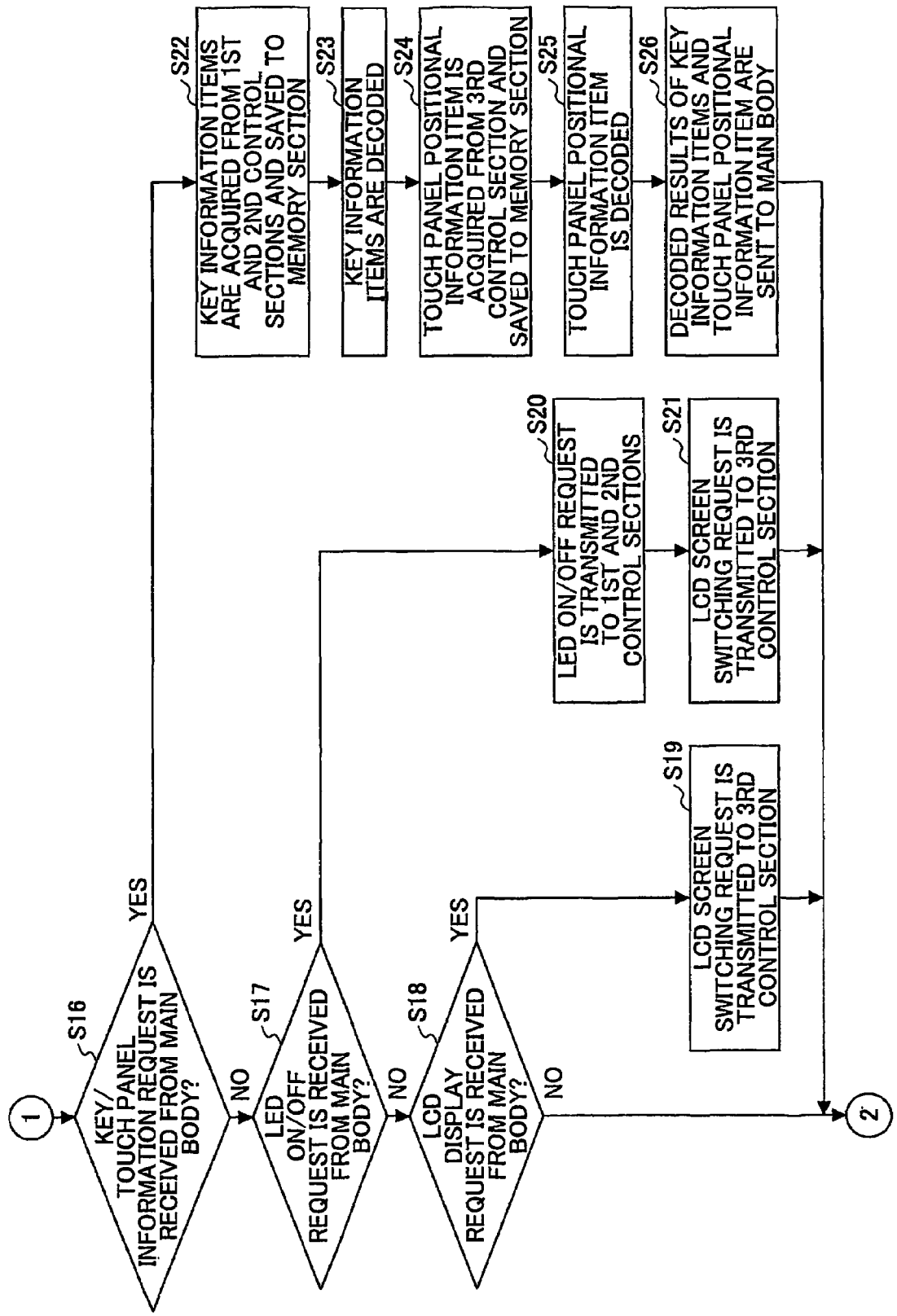
FIG. 7 (continued from FIG. 6) is a flowchart showing processing performed by a control section of a base block of FIG. 3 according to an embodiment of the present invention.

The following describes an example of processing performed by the control section 311 of the base block 31 with reference to FIGS. 6 and 7. FIG. 6 is a flowchart showing a part of the processing performed by the control section 311 of the base block 31 of FIG. 3. FIG. 7 is a flowchart showing the rest of the processing performed by the control section 311 of the base block 31 of FIG. 3.

In step S1, the control section 311 determines whether the display operations block 34 is removed from the main body 2 based on detection by the removal detecting section 313. If the control section 311 determines that the display operations block 34 is not removed (No in step S1), the power sources are switched such that the second charger section 314b of the charger 314 supplies power to the display operations block 34 in step S2. Then, the interface to be used for input to and output from the display operations block 34 is set to the corresponding wired interface 316 in step S3, and the processing proceeds to step S4.

In step S4, the control section 311 determines whether the second operations block 33 is removed from the main body 2 based on detection by the removal detecting section 313. If the control section 311 determines that the second operations block 33 is not removed (No in step S4), the processing proceeds to step S5.

In step S5, the power sources are switched such that the first charger section 314a of the charger 314 supplies power to the second operations block 33. Then in step S6, the interface to be used for input to and output from the second operations block 33 is set to the corresponding wired interface 316. Then in step S7, an LCD screen switching request for showing the first display screen IMG1 of FIG. 2B is transmitted to the third control section 341 such that the LCD 346 shows the first display screen IMG1, and the processing proceeds to step S16 of FIG. 7.

On the other hand, if the control section 311 determines that the second operations block 33 is removed (Yes in step S4), the power sources are switched by suspending the power supply to the second operations block 33 from the first charger section 314a of the charger 314 in step S8. Then, the interface to be used for input to and output from the second operations block 33 is set to the corresponding wireless interface 317 in step S9. Then in step S10, an LCD screen switching request for showing the third display screen IMG3 of FIG. 5B is transmitted to the third control section 341 such that the LCD 346 shows the third display screen IMG3, and the processing proceeds to step S16 of FIG. 7.

If the control section 311 determines that the display operations block 34 is removed (Yes in step S1), the power sources are switched by suspending the power supply to the display operations block 34 from the second charger section 314b of the charger 314 in step S11. Then, the interface to be used for input to and output from the display operations block 34 is set to the corresponding wireless interface 317 in step S12, and the processing proceeds to Step S13.

In step S13, the power sources are switched such that the first charger section 314a of the charger 314 supplies power to the second operations block 33. Then in step S14, the interface to be used for input to and output from the second operations block 33 is set to the corresponding wired interface 316. Then in step S15, an LCD screen switching request for showing the second display screen IMG2 of FIG. 4B is transmitted to the third control section 341 such that the LCD 346 shows the second display screen IMG2, and the processing proceeds to step S16 of FIG. 7.

In step S16 of FIG. 7, the control section 311 determines whether a key/touch panel information request is received from the main body 2 via the main body interface 36. If the control section 311 determines that the key/touch panel information request is not received (No in step S16), the processing proceeds to step S17.

In step S17, the control section 311 determines whether an ON/OFF request for turning on/off the LEDs 325 is received from the main body 2 via the main body interface 36. If the control section 311 determines that the ON/OFF request is not received (No in step S17), the processing proceeds to step S18.

In step S18, the control section 311 determines whether a display request for causing the LCD 346 to show a display screen is received from the main body 2 via the main body interface 36. If the control section 311 determines that the display request is not received (No in step S18), the processing returns to step S1 of FIG. 6 to repeat a series of the operations. If, on the other hand, the control section 311 determines that the display request is received (Yes in step S18), an LCD screen switching request for showing the display screen corresponding to the display request is transmitted to the third control section 341 of the display operations block 34 such that the LCD 346 shows the display screen corresponding to the display request in step S19. Then, the processing returns to step S1 of FIG. 6 to repeat a series of the operations.

If the control section 311 determines that the ON/OFF request for turning on/off the LEDs 325 is received (Yes in step S17), On/OFF requests for turning on/off the LEDs 325 and the start LED 336 are transmitted to the first control section 321 and the second control section 331, respectively, such that the first and second control sections 321 and 331 perform ON/OFF control according to the respective requests in step S20. Then in step S21, an LCD screen switching request for showing the display screen corresponding to the display request is transmitted to the third control section 341 of the display operations block 34 such that the LCD 346 shows the display screen corresponding to the display request. Then, the processing returns to step S1 of FIG. 6 to repeat a series of the operations.

If in step S16 the control section 311 determines that the key/touch panel information request is received (Yes in step S16), the control section 311 acquires key information items from the first control section 321 and the second control section 331 and saves the acquired key information items in the memory section 312. The key information items held in the memory section 312 are decoded and converted into main body interface signals so as to be transmitted to the main body 2 in step S23, and the processing proceeds to step S24.

In step S24, the control section (selection information retrieving unit) 311 acquires a touch panel positional information item (corresponding to selection information item in the appended claims) indicating a selected position on the touch panel 348 from the third control section 341 and saves the acquired touch panel positional information item in the memory section 312. The touch panel positional information item held in the memory section 312 is decoded and converted into main body interface signals so as to be transmitted to the main body 2 in step S25, and the processing proceeds to step S26.

In step S26, the control section 311 (selection information output unit) outputs the main body interface signals as the decoded results of the key information items and the touch panel positional information item (selection information item) via the main body interface 36 to the main body 2 in step S26, and the processing returns to step S1 to repeat a series of the operations.

In the above embodiment, the control section 311 of the base block 31 functions as a selection information detecting unit and a selection information output unit in the appended claims.

In the above embodiment, the base block 31 specifies the display screen to be shown for the display operations block 34 according to whether the second operations block 33 and the display operations block 34 are attached to the main body 2. However, the present invention is not limited to this embodiment. For example, the display operations block 34 may determine the display screen to be shown by acquiring information about whether the second operations block 33 and the display operations block 34 are attached to the main body 2.

Figure 8:
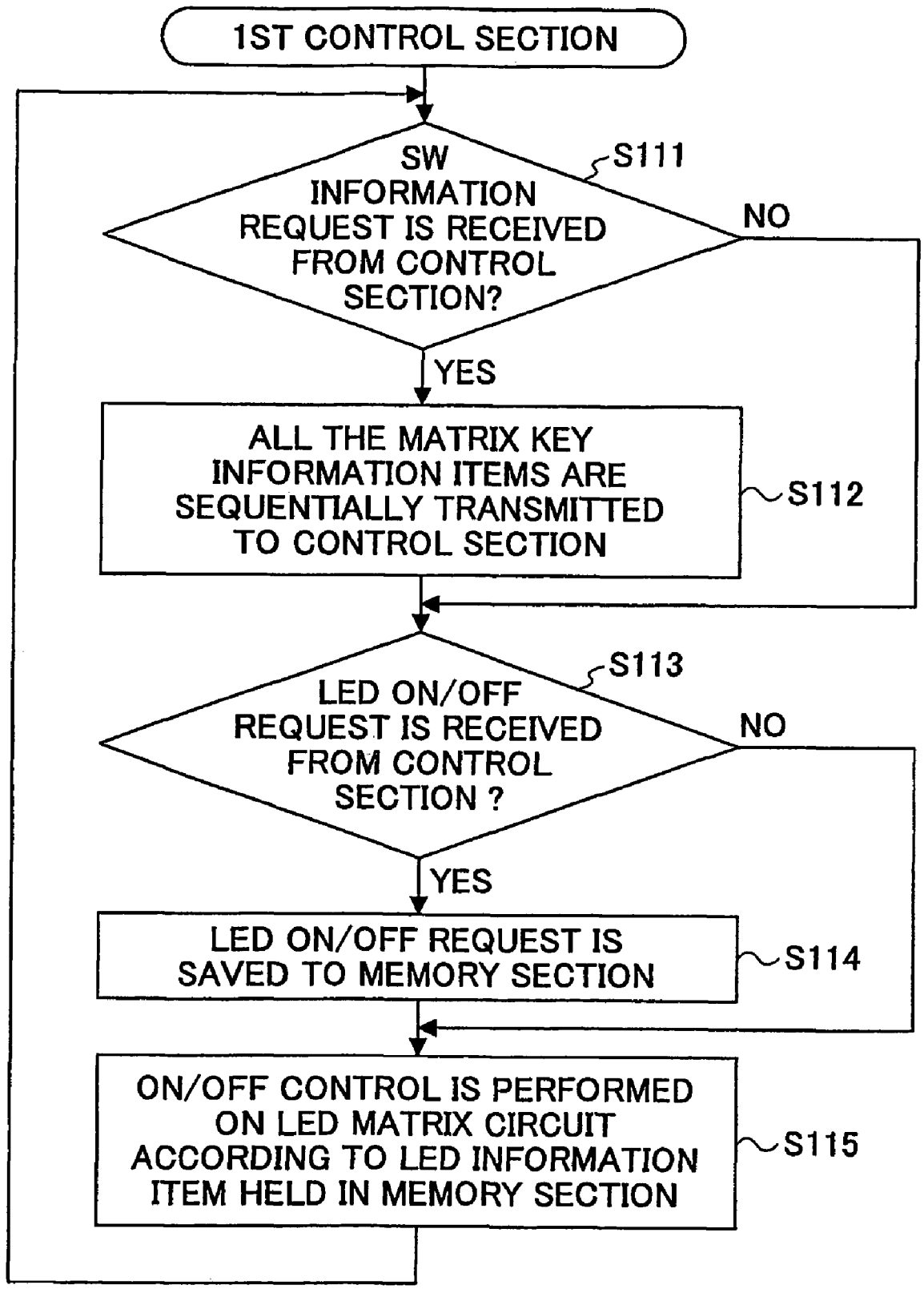
FIG. 8 is a flowchart showing processing performed by a first control section of a first operations block of FIG. 3 according to an embodiment of the present invention.

The following describes an example of processing performed by the first control section 321 of the first operations block 32 with reference to FIG. 8. FIG. 8 is a flowchart showing the processing performed by the first control section 321 of the first operations block 32 of FIG. 3 according to an embodiment of the present invention.

In step S111, the first control section 321 determines whether an SW information request for output of a matrix key information item to be used for detecting the operation keys 327 is received from the control section 311 of the base block 31. If the first control section 321 determines that the SW information request is not received (No in step S111), the processing proceeds to step S113. If, on the other hand, the control section 311 determines that the SW information request is received (Yes in step S111), all the matrix key information items held in the LED matrix circuit 324 are sequentially transmitted to the control section 311 of the base block 31 in step S112. Then, the processing proceeds to step S113.

In step S113, the first control section 321 determines whether an ON/OFF request for turning on/off the LEDs 325 is received from the control section 311 of the base block 31. If the first control section 321 determines that the ON/OFF request is not received (No in step S113), the processing proceeds to step S115. If, on the other hand, the first control section 321 determines that the ON/OFF request is received (Yes in step S113), an LED information item indicating the ON/OFF status of the LEDs 325 corresponding to the ON/OFF request is saved in the memory section 322 in step S114. Then, the processing proceeds to step S115.

In step S115, ON/OFF control is performed on the LED matrix circuit 324 according to the LED information item held in the memory section 322 so as to turn on/off the LEDs 325. Then the processing returns to step S111 to repeat a series of the operations.

Figure 9:
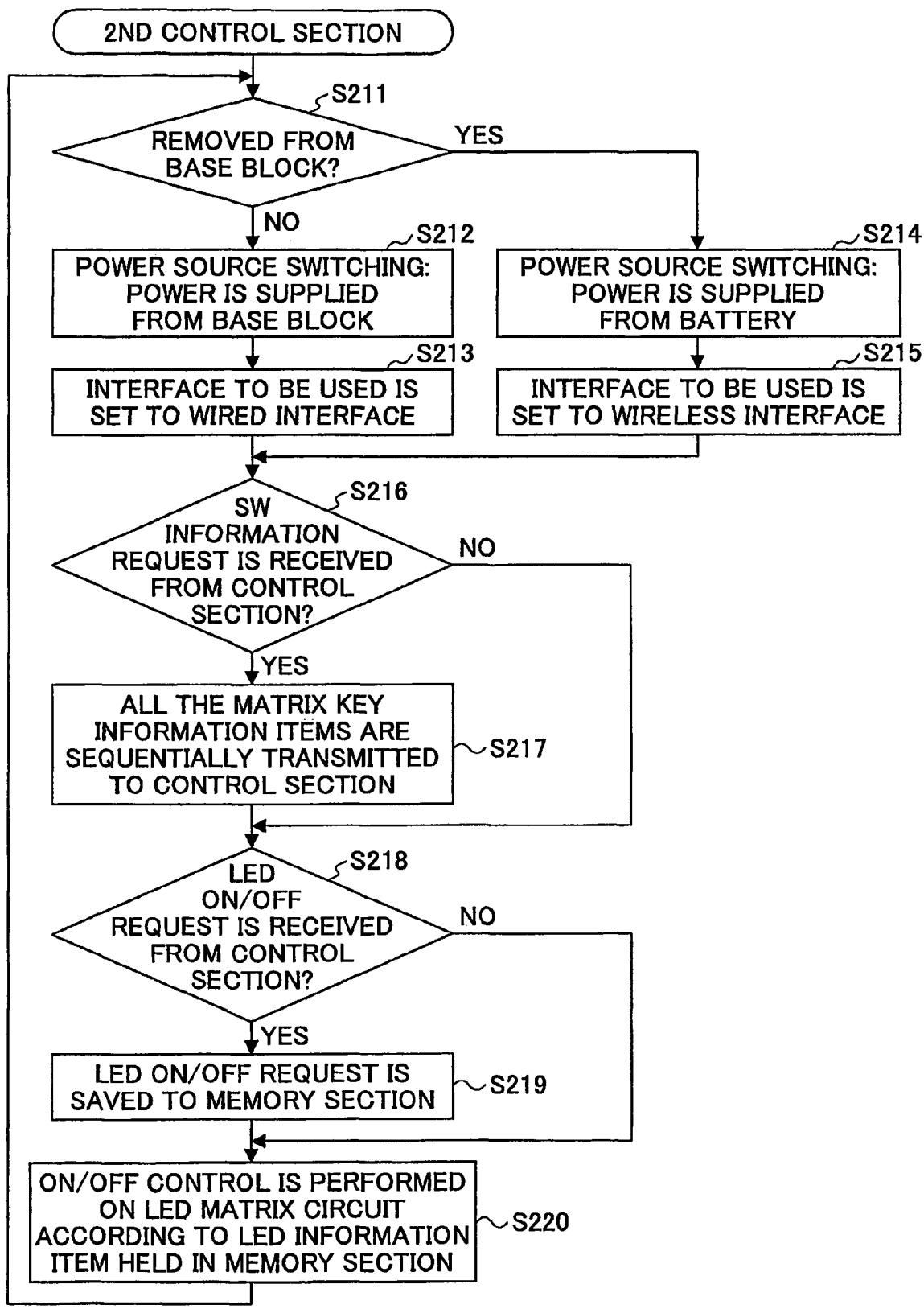
FIG. 9 is a flowchart showing processing performed by a second control section of a second operations block of FIG. 3 according to an embodiment of the present invention.

The following describes an example of processing performed by the second control section 331 of the second operations block 33 with reference to FIG. 9. FIG. 9 is a flowchart showing the processing performed by the second control section 331 of the second operations block 33 of FIG. 3 according to an embodiment of the present invention.

In step S211, the second control section 331 determines whether the second operations block 33 is removed from the base block 31 (main body 2) based on the status of an internal contact switch and a result of communication with the base block 31, etc. If the second control section 331 determines that the second operations block 33 is not removed (No in step S211), power sources are switched such that power is supplied from the base block 31 in step S212. Then, the interface to be used is set to the wired interface 333 in step S213, and the processing proceeds to step S216.

If, on the other hand, the second control section 331 determines that the second operations block 33 is removed (Yes in step S211), the power sources are switched such that power is supplied from the battery 339 in step S214. Then, the interface to be used is set to the wireless interface 334 in step S215, and the processing proceeds to step S216.

In step S216, the second control section 331 determines whether an SW information request is received from the control section 311 of the base block 31. If the second control section 331 determines that the SW information request is not received (No in step S216), the processing proceeds to step S218. If, on the other hand, the second control section 331 determines that the SW information request is received (Yes in step S216), all the matrix key information items held in the LED matrix circuit 335 are sequentially transmitted to the control section 311 of the base block 31 in step S217. Then, the processing proceeds to step S218.

In step S218, the second control section 331 determines whether an ON/OFF request for turning on/off the start LED 336 is received from the control section 311 of the base block 31. If the control section 311 determines that the ON/OFF request is not received (No in step S218), the processing proceeds to step S220. If, on the other hand, the second control section 331 determines that the ON/OFF request is received (Yes in step S218), an LED information item indicating the ON/OFF status of the start LED 336 corresponding to the ON/OFF request is saved to the memory section 332 in step S219. Then, the processing proceeds to step S220.

In step S220, ON/OFF control is performed on the LED matrix circuit 335 according to the LED information item held in the memory section 332 so as to turn on/off the start LED 336. Then the processing returns to step S211 to repeat a series of the operations.

Figure 10A:
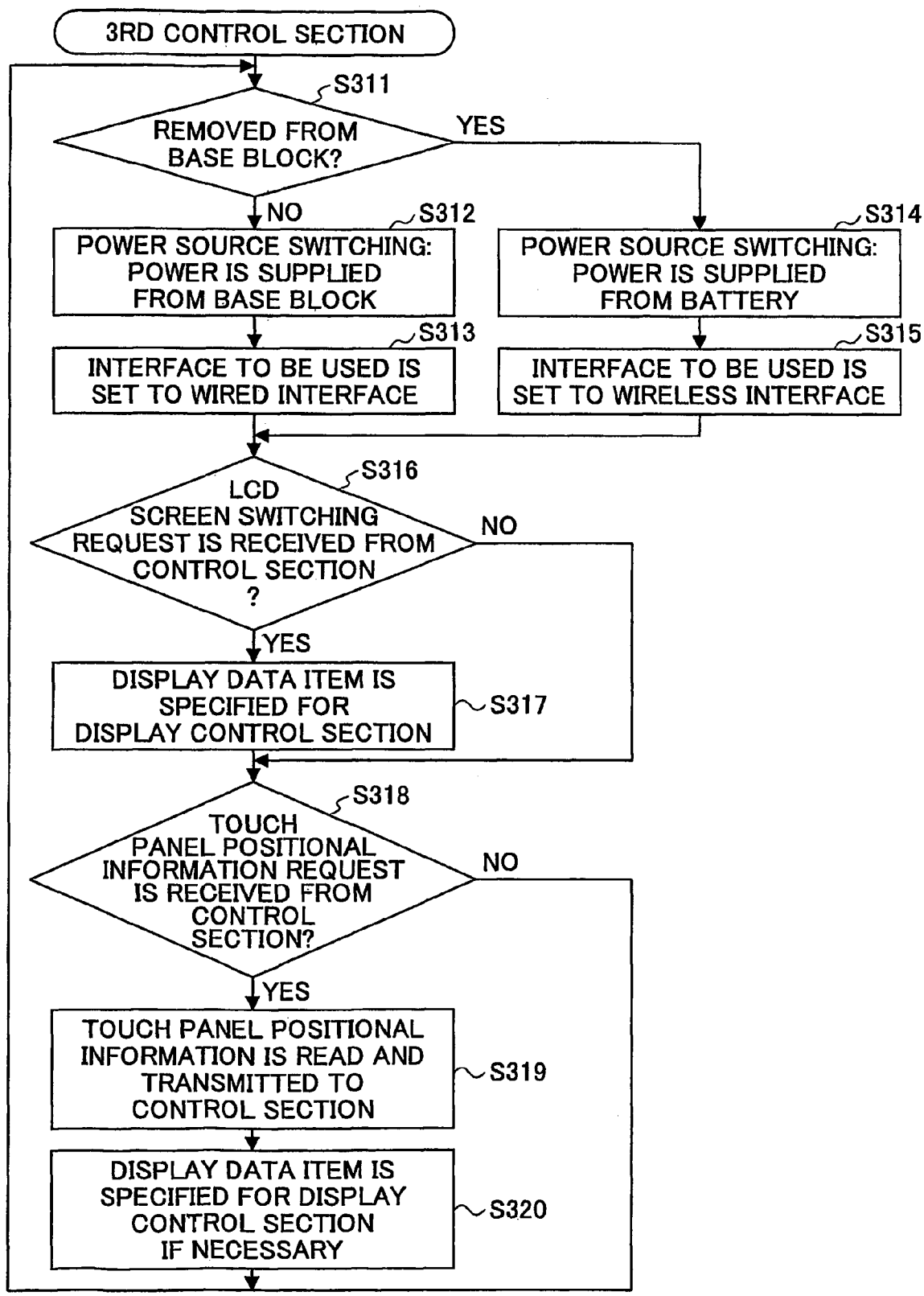
FIG. 10A is a flowchart showing processing performed by a third control section of a display operations block of FIG. 3 according to an embodiment of the present invention.
Figure 10B:
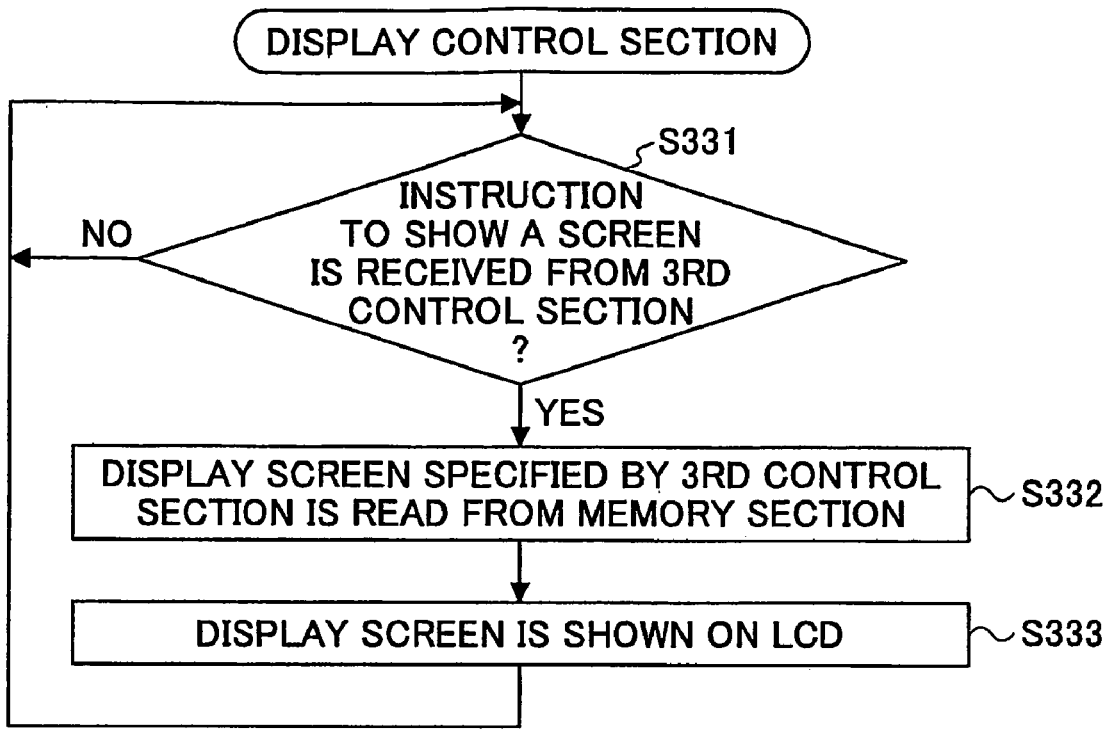
FIG. 10B is a flowchart showing an example of processing performed by a display control section of a display operations block.
Figure 10C:
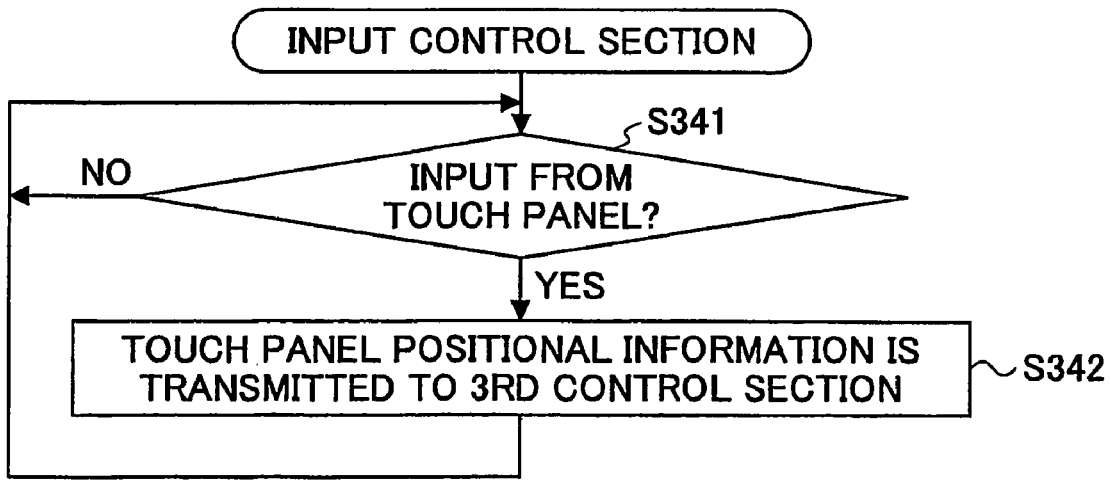
FIG. 10C is a flowchart showing an example of processing performed by an input control section of a display operations block.

The following describes an example of processing performed by the third control section 341 of the display operations block 34 with reference to FIG. 10A. FIG. 10A is a flowchart showing the processing performed by the third control section 341 of the display operations block 34 of FIG. 3 according to an embodiment of the present invention. FIG. 10B is a flowchart showing an example of processing performed by the display control section 345 of the display operations block 34. FIG. 10C is a flowchart showing an example of processing performed by the input control section 347 of the display operations block 34.

In step S311 of FIG. 10A, the third control section 341 determines whether the display operations block 34 is removed from the base block 31 (main body 2) based on the status of an internal contact switch and a result of communication with the base block 31, etc. If the third control section 341 determines that the display operations block 34 is not removed (No in step S311), the power sources are switched such that power is supplied from the base block 31. Then, the interface to be used is set to the wired interface 343 in step S313, and the processing proceeds to step S316.

If, on the other hand, the third control section 341 determines that the display operations block 34 is removed (Yes in step S311), the power sources are switched such that power is supplied from the battery 349. Then, the interface to be used is set to the wireless interface 344 in step S315, and the processing proceeds to step S316.

In step S316, the third control section 341 determines whether an LCD screen switching request is received from the control section 311 of the base block 31. If the third control section 341 determines that the LCD screen switching request is not received (No in step S316), the processing proceeds to step S318. If, on the other hand, the third control section 341 determines that the LCD screen switching request is received (Yes in step S316), the third control section 341 retrieves a display data item (corresponding to a selection item) corresponding to the LCD screen switching request, and instructs the display control section 345 to show a screen with the display data item in step S317. Then, the processing proceeds to step S318.

In step S318, the third control section 341 determines whether a touch panel positional information request is received from the control section 311 of the base block 31. If the third control section 341 determines that the touch panel positional information request is not received (No in step S318), the processing returns to step S311 to repeat a series of the operations. If, on the other hand, the third control section 341 determines that the touch panel positional information request is received (Yes in step S318), the third control section 341 reads a touch panel positional information item corresponding to a position on the touch panel 348 selected by a user and transmits the read touch panel positional information item to the control section 311 in step S319. Then, the processing proceeds to step S320.

In step S320, the third control section 341 specifies the display data item for the display control section 345, if necessary, such that the screen shown on the LCD 346 is updated. Then, the processing proceeds to step S311 to repeat a series of the operations.

In the above embodiment, the third control section 341 of the display operations block 34 functions as a display control unit and a selection item retrieving unit in the appended claims. The display data item corresponding to the selection item may be retrieved in various different ways. For example, the display data item may be stored in a predetermined storage medium in advance so as to be retrieved in response to an instruction from the control section 311.

The following describes an example of the processing performed by the display control section 345 of the display operations block 34 with reference to FIG. 10B.

In step S331, the display control section 345 determines whether an instruction to show a screen is received from the third control section 341. If the display control section 345 determines that the instruction to show a screen is not received (No in step S331), the display control section 345 waits for the instruction while repeating this determination step S331. If, on the other hand, the display control section 345 determines that the instruction to show a screen is received (Yes in step S331), the display control section 345 reads a display data item (corresponding to a selection item) corresponding to a display screen specified by the third control section 341 from the memory section 342 in step S332 such that the LCD 346 shows the display screen with the read display data item in step S333. Then the processing returns to step S331 to repeat a series of the operations.

The following describes an example of the processing performed by the input control section 347 of the display operations block 34 with reference to FIG. 10C.

In step S341, the input control section 347 determines whether there is input from the touch panel 348. If the input control section 347 determines that there is no input (No in step S341), the input control section 347 waits for input from the touch panel 348 while repeating the determination step S341. If, on the other hand, the input control section 347 determines that there is input from the touch panel 348 (Yes in step S341), the input control section 347 generates a touch panel positional information item indicating a selected position on the touch panel 348 and transmits the touch panel positional information item to the third control section 341 in step S342. Then, the processing returns to the step S341 to repeat a series of the operations.

In this embodiment, the base block 31 specifies display data items for the display operations block 34 according to whether the second operations block 33' and the display operations block 34 are removed from the main body 2. However, the present invention is, not limited to this embodiment. For example, display data items to be shown when the second operations block 33 and the display operations block 34 are removed may be stored in advance in, e.g., the memory section 342 such that one or more of the display data items are extracted from the memory section 342 according to whether the second operations block 33 and the display operations block 34 are removed.

The following describes an example of the operations performed in the operations panel 3 on the image forming apparatus 1 having the above-described configuration according to the present invention.

When the display operations block 34 is removed from the main body 2 of the image forming apparatus 1 and receives an LCD screen switching request from the base block 31, the display operations block 34 shows the second display screen IMG2 by causing the LCD (display unit) 346 to show the display data items (selection items) corresponding to the first operations block 32 and the second operations block 33 together with the display selection items under the control of the third control section 341 (display control unit). The user selects any of the selection items or the display selection items shown on the LCD 346, and the selected item is detected by the touch panel 348 (selection detecting unit).

Then, the control section (selection information retrieving unit) 311 retrieves the selection result as a touch panel positional information item (selection information item). The control section (selection information output unit) 311 outputs the touch panel positional information item to the image forming apparatus (electronic apparatus) 1 on which the operations panel 3 is installed.

Accordingly, when the display operations block 34 is removed from the main body 2 of the image forming apparatus 1 and used as a remote controller, all the functions of the first and second operations blocks 32 and 33 remaining on the main body 2 can be used from the display operations block 34. Therefore, the operability of the operations panel 3 that can be used in a position removed from the main body 2 of the image forming apparatus 1 is improved. The operations panel 3 can realize barrier-free use of the image forming apparatus 1 without limiting the functions of the image forming apparatus 1. For example, wheelchair users can use all the functions of the image forming apparatus 1 in a position convenient to them with use of the display operations block 34 removed from the main body 2. The operations panel 3 can also avoid reflection of light more easily compared to the related-art operations panels having conventional installation angle adjusting functions.

As described above, when the second operations block 33, which is removably attached to the main body 2, is removed from the main body 2, the display operations block 34 remaining on the main body 2 shows the selection items corresponding to the second operations block 33 so as to allow users to select any of the selection items. This configuration prevents the operability at the main body 2 from being lowered due to the removal of the second operations block 33.

The display operations block 34 retrieves the selection items corresponding to the first and second operations blocks 32 and 33 from the first and second operations blocks 32 and 33 remaining on the main body 2 when the display operations block 34 is removed from the main body 2. Therefore, the display operations block 34 can respond to the change of the operations blocks with ease, which contributes to widening applicability of the operations panel 3.

The following describes interruption control performed in the image forming apparatus 1 comprising the above-described operations panel 3. The configuration of the image forming apparatus 1 is the same as the one described above, and is not described herein.

In the image forming apparatus, the main body 2 and the operations panel 3 are controlled by the main body control section 21 and the control section 311, respectively. The main body control section 21 is adapted to send input requests to the control section 311, analyze validity of input signal, and perform sequence control on the main body 2, for example. The control section 311 of the operations panel 3 is adapted to perform display control on the operations panel 3, acquire input signals from the operations blocks 32-34, and communicate with the main body 2. For instance, the control section 311 can decode input signals sent from the main body control section 21 so as to cause the display operations block 34 to show the decoded result, and can read input signal sent from the operations blocks 32-34 so as to send the read result to the main body 2. Predetermined codes are assigned to control signals and are shared by the control sections of the main body 2 and the operations panel 3 for the purpose of maintaining operational consistency.

In related-art interruption control, when an interruption request is received, a main body control section determines whether an interruption is acceptable. If the interruption is acceptable, interruption processing is performed. If, on the other hand, the interruption is not acceptable, the interruption is rejected. In the interruption processing, conditions that have been set before the interruption are held in a storage device that is accessible by the main control section, and then an input request for an interruption operation is output. When the interruption operation is completed, an input restart request is output based on information about the suspended operation held in the storage device so as to restart the suspended operation.

The problem with this related-art interruption control is that the ongoing operation is suspended by the interruption. Especially, in the case of an image forming apparatus with an operations panel 3 having an operations block removably attachable to a main body 2 just like the above-described image forming apparatus 1, when an interruption key is pressed on the operations block removed from the main body 2, a user using the operations panel 3 installed on the main body 2 suddenly becomes unable to continue operations. Therefore, the user might think that the image forming apparatus has broken down.

The following is an example of processing performed by the control section 311 of the base block 31 of the operations panel 3 of an embodiment of the present invention, wherein an ongoing operation can be continued without being suspended by the interruption. It is to be noted that as the basic processing is the same as the processing shown in FIGS. 6 and 7, the following describes the different points only.

Figure 11:
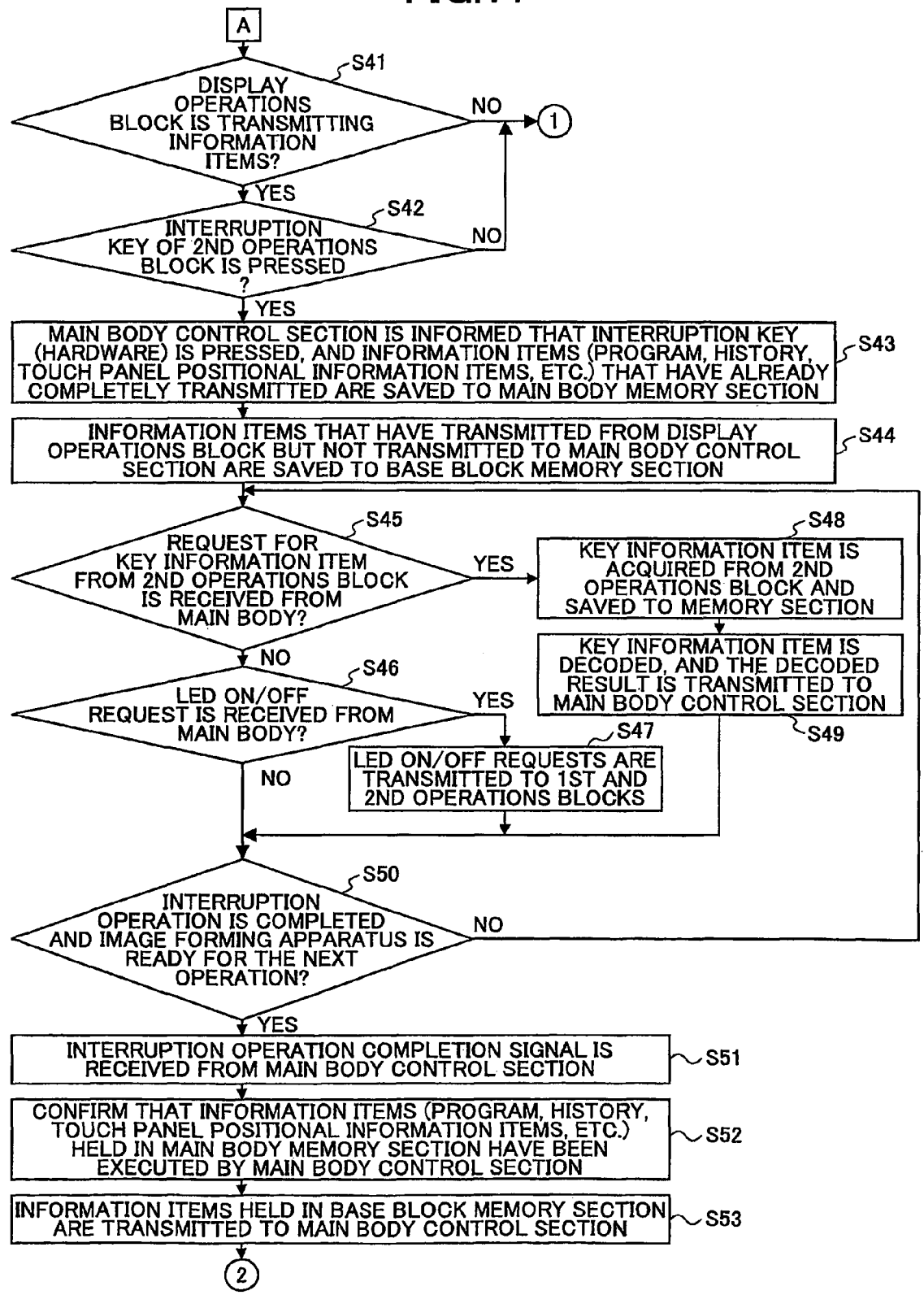
FIG. 11 is a flowchart showing interruption processing that can be added to the flowchart of FIG. 6 in the case where a second operations block is removed.

The following describes interruption processing performed when the second operations block 33 is removed with reference to FIG. 11. FIG. 11 is a flowchart showing interruption processing that can be added to the flowchart of FIG. 6 in the case where the second operations block 33 is removed.

The steps shown in the flowchart of FIG. 11 are to be added to the block "A" in the flowchart of FIG. 6. In other words, the steps shown in the flowchart of FIG. 11 are performed after step S10 in which the third display screen IMG3 is shown. In step S41, the control section 311 determines whether the display operations block 34 is transmitting information items (i.e. is being operated). If the control section 311 determines that the display operations block 34 is not transmitting information items (No in step S41), the processing proceeds to step S16 of FIG. 7 to repeat a series of the operations. If, on the other hand, the control section 311 determines that the display operations block 34 is transmitting information items (Yes in step S41), the processing proceeds to step S42.

In step S42, the control section 311 determines whether the interruption key of the second operations block 33 is pressed. If the control section 311 determines that the interruption key is not pressed (No in step S42), the processing proceeds to step S16 of FIG. 7 to repeat a series of the operations. If, on the other hand, the control section 311 determines that the interruption key is pressed (Yes in step S42), the processing proceeds to step S43.

In step S43, the control section 311 reports to the main body control section 21 that the interruption key (hardware) is pressed, information items (program, history, touch panel positional information items, etc.) that have already been completely transmitted are saved to the memory section 23 of the main body 2. In step S44, information items that have transmitted from the display operations block 34 but not transmitted to the main body control section 21 are saved in the memory section 312 of the base block 31. Then, the processing proceeds to step S45.

In step S45, the control section 311 determines whether a key information request for a key information item from the second operations block 33 is received from the main body 2.

If the control section 311 determines that the key information request is not received (No in step S45), the control section 311 determines whether an LED ON/OFF request is received from the main body 2 in step S46. If the control section 311 determines that the ON/OFF request is not received (No in step S46), the processing proceeds to step S50.

If, on the other hand, the control section 311 determines that the ON/OFF request is received (Yes in step S46), ON/OFF requests are transmitted to the corresponding first and second operations blocks 32 and 33 such that the first and second control sections 321 and 331 perform ON/OFF control according to the respective requests in step S47. Then, the processing proceeds to step S50.

If, in step S45, the control section 311 determines that the key information request for a key information item from the second operations block 33 is received (Yes in step S45), the control section 311 acquires the key information item from the second operations block 33 and saves the acquired key information item in the memory section 312 in step S48. Then in step S49, the key information item held in the memory section 312 is decoded, and the decoded result is transmitted to the main body control section 21. Then, the processing proceeds to step S50.

In step S50, the control section 311 determines whether the interruption operation is completed and whether the image forming apparatus 1 is ready for the next operation. If the control section 311 determines that the image forming apparatus 1 is not ready for the next operation (No in step S50), the processing returns to step S45 to repeat a series of the operations. If, on the other hand, the control section 311 determines that the image forming apparatus 1 is ready for the next operation (Yes in step S50), the processing proceeds to step S51.

The control section 311 receives an interruption operation completion signal from the main body control section 21 in step S51, and confirms that the information items (program, history, touch panel positional information items, etc.) held in the memory section 23 have been executed by the main body control section 21 in step S52. In step S53, the information items held in the memory section 312 of the base block 31 are transmitted to the main body control section 21. Then, the processing returns to step S1 of FIG. 6 to repeat a series of the operations.

Figure 12:
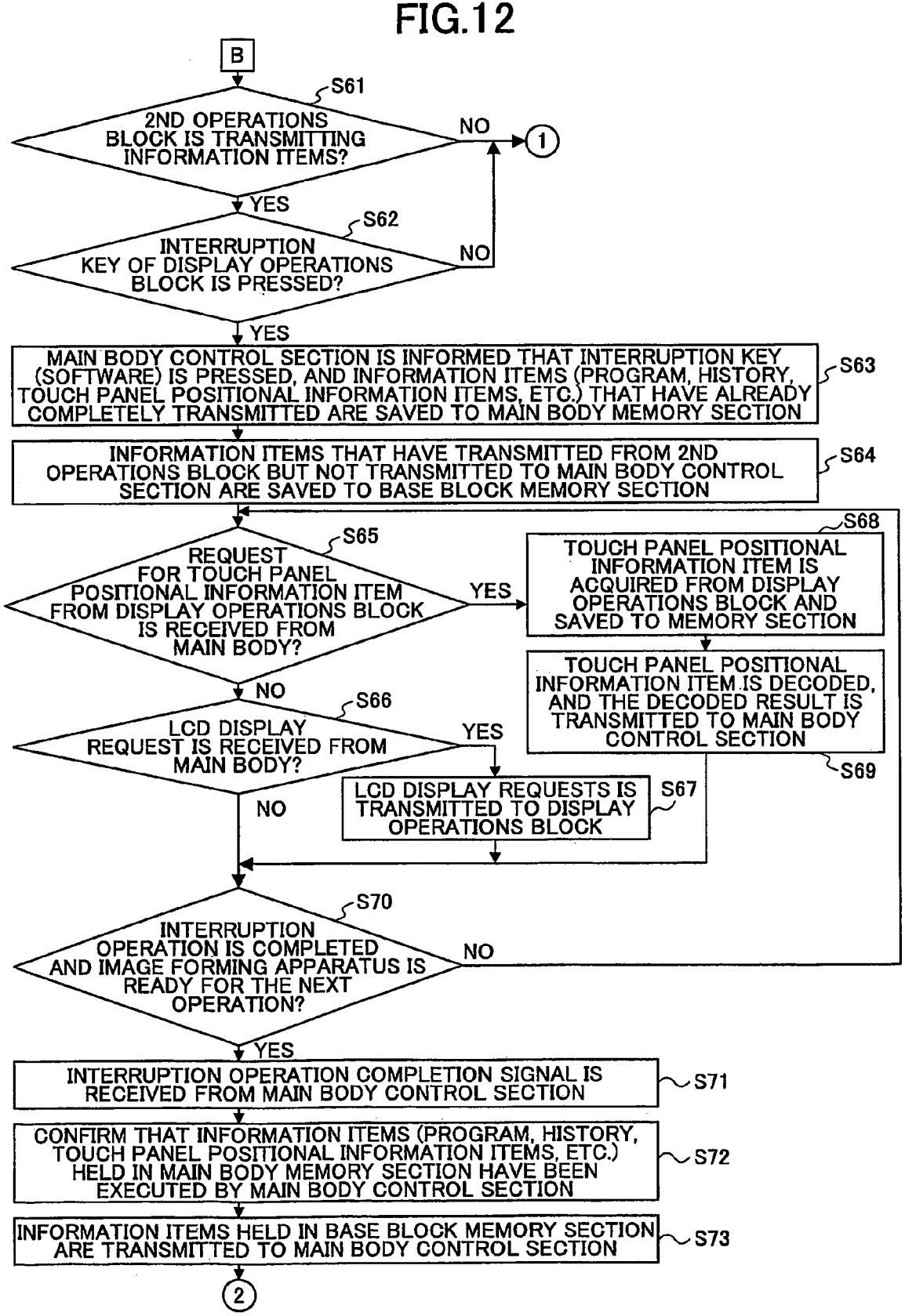
FIG. 12 is a flowchart showing interruption processing that can be added to the flowchart of FIG. 6 in the case where a display operations block is removed.

The following describes interruption processing performed when the display operations block 34 is removed with reference to FIG. 12. FIG. 12 is a flowchart showing interruption processing that can be added to the flowchart of FIG. 6 in the case where the display operations block 34 is removed.

The steps shown in the flowchart of FIG. 12 are to be added to the block "B" in the flowchart of FIG. 6. In other words, the steps shown in the flowchart of FIG. 12 are performed after step S15 in which the second display screen IMG2 is shown. In step S61, the control section 311 determines whether the second operations block 33 is transmitting information items (i.e. is being operated). If the control section 311 determines that the second operations block 33 is not transmitting information items (No in step S61), the processing proceeds to step S16 of FIG. 7 to repeat a series of the operations. If, on the other hand, the control section 311 determines that the second operations block 33 is transmitting information items (Yes in step S61), the processing proceeds to step S62.

In step S62, the control section 311 determines whether the interruption key of the display operations block 34 is pressed. If the control section 311 determines that the interruption key is not pressed (i.e. not selected) (No in step S62), the processing proceeds to step S16 of FIG. 7 to repeat a series of the operations. If, on the other hand, the control section 311 determines that the interruption key is pressed (Yes in step S62), the processing proceeds to step S63.

In step S63, the control section 311 reports to the main body control section 21 that the interruption key (software) is pressed (selected), information items (program, history, touch panel positional information items, etc.) that have already been completely transmitted are saved in the memory section 23 of the main body 2. In step S64, information items that have been transmitted from the second operations block 33 but not transmitted to the main body control section 21 are saved in the memory section 312 of the base block 31. Then, the processing proceeds to step S65.

In step S65, the control section 311 determines whether a key information request for a key information item from the display operations block 34 is received from the main body 2. If the control section 311 determines that the key information request is not received (No in step S65), the control section 311 determines whether an LCD display request is received from the main body 2 in step S66. If the control section 311 determines that the LCD display request is not received (No in step S66), the processing proceeds to step S70.

If, on the other hand, the control section 311 determines that the LCD display request is received (Yes in step S66), the control section 311 instructs the display operations block 34 to show the display screen corresponding to the LCD display request on the LCD 346 in step S67. Then, the processing proceeds to step S70.

If, in step S65, the control section 311 determines that the key information request for a key information item from the display operations block 34 is received (Yes in step S65), the control section 311 acquires the key information item from the display operations block 34 and saves the acquired key information item in the memory section 312 in step S68. Then in step S69, the key information item held in the memory section 312 is decoded, and the decoded result is transmitted to the main body control section 21. Then, the processing proceeds to step S70.

In step S70, the control section 311 determines whether the interruption operation is completed and whether the image forming apparatus 1 is ready for the next operation. If the control section 311 determines that the image forming apparatus 1 is not ready for the next operation (No in step S70), the processing returns to step S65 to repeat a series of the operations. If, on the other hand, the control section 311 determines that the image forming apparatus 1 is ready for the next operation (Yes in step S70), the processing proceeds to step S71.

The control section 311 receives an interruption operation completion signal from the main body control section 21 in step S71, and confirms that the information items (program, history, touch panel positional information items, etc.) held in the memory section 23 have been executed by the main body control section 21 in step S72. In step S73, the information items held in the memory section 312 of the base block 31 are transmitted to the main body control section 21. Then, the processing returns to step S1 of FIG. 6 to repeat a series of the operations.

In the above embodiment, the control section 311 of the base block 31 also functions as an interruption detecting unit and an interruption completion detecting unit in the appended claims. Further, the memory section 312 of the base block 31 functions as a selection information memory unit in the appended claims.

The following is an example of the interruption processing performed in the image forming apparatus 1 according to an embodiment of the present invention.

A first person is performing complicated operations using the operations panel 3 of the image forming apparatus 1.

The display operations block 34 shows touch panel, including, e.g., soft keys for various functions of the image forming apparatus 1, and feedback information items from the main body control section 21. The first person performs the operations using the first operations block 32 and the display operations block 34 having soft and hard keys while monitoring the feedback information items.

In this situation, a second person removes the second operations block 33, which includes the numeric keys, in order to just make a photocopy using the second operations block 33 as a remote controller. When the control section 311 of the base block 31 detects that the second operations block 33 is removed, the display operations block 34 zooms out the soft keys and feedback information that have been shown so as to show another sets of soft keys that replace the keys of the removed second operations block 33 and other feedback information items on the same screen. The first person can therefore continue the operations. Then, the second person, who has removed the second operations block 33, presses the interruption key of the second operations block 33 in order to make a photocopy.

Upon detecting that that the interruption key is pressed, the control section 311 of the base block 31 sends an interruption request signal to the main body control section 21. Upon receiving the interruption request signal, the main body control section 21 temporarily stores various conditions that have been input and set up to that point in the memory section 23 so as to be in a standby mode, and outputs a request for the next input (interruption input) to the control section 311 of the base block 31.

In response to the interruption input request from the main body control section 21, the control section 311 of the base block 31 saves information items input from the first operations block 32 and the display operations block 34 in the memory section (selection information memory unit) 312 as records while waiting for an input from the second operations block 33. When the control section 311 receives an input from the second operations block 33, the control section 311 sends the input to the main body control section 21 (in a predetermined encoded form).

For example, if the second person only needs to make a photocopy, the second person places an original document on a document table, selects the number of copies using the numeric keys of the second operations block 33, and presses the start key. The control section 311 of the base block 31 transmits information indicating the number of copies and a copy start command to the main body control section 21 in the encoded form.

Upon receiving the encoded information, the main body control section 21 executes sequence control for making a photocopy. After completion of the copy operation, the main body control section 21 sets the conditions of the main body 2 back to the conditions before the interruption, and outputs a request for the next input. In response to the input request, the control section 311 of the base block 31 determines that the interruption operation is completed, returns to the state before the interruption, transmits operations information that has been saved in the memory section 312 after the interruption, and restarts the last interrupted operation.

In this way, with the operations panel 3 having the above-described configuration, when an interruption request is issued from the second operations block 33 or the display operations block 34, selection information items input during the interrupting operation are saved in order of time. When the interruption operation is completed, the selection information items saved during the interruption operation are output. Accordingly, for example, an interruption operation of, e.g., making one copy, can be easily cut into an ongoing operation. Moreover, a user who has been performing an operation can continue input while the interruption operation is performed. That is, if the interruption key is pressed, inputs for the interrupted operation can be performed, without being suspended, in parallel with the interruption operation. Thus, operating efficiency of the operations panel 3 is improved.

Figure 13:
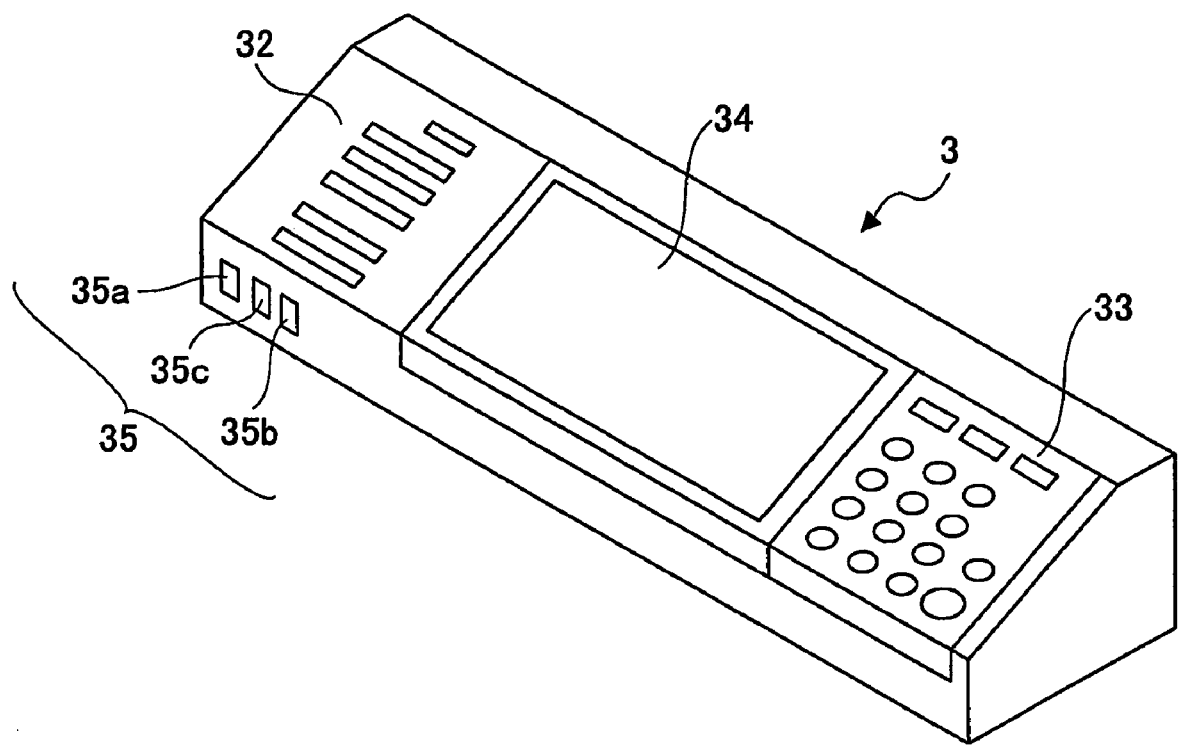
FIG. 13 is a perspective view illustrating an operations panel having a failure alert function.

The following describes an operations panel 3 to which a failure alert function is added according to an embodiment of the present invention. The configuration of the operations panel 3 in this embodiment is the same as the one in the above embodiments except the differences described below. FIG. 13 is a perspective view illustrating the operations panel 3 having the failure alert function.

The operations panel 3 comprises the base block 31, the first operations block 32, the second operations block 33, and the display operations block 34, which are described in the above embodiments. A failure display section 35 that provides a failure alert function for showing failures of the operations blocks 32-34 is added to the base block 31.

The failure display section 35 comprises a first status display section 35a, a second status display section 35b, and a third status display section 35c corresponding to the first operations block 32, the second operations block 33, and the display operations block 34, respectively. The first-third status display sections 35a-35c include displays, such as LEDs, that are turned on/off by the control section 311.

Although the failure display section 35 is added to the base block 31 in this embodiment, the failure display section 35 may be added in various different forms. For example, the failure display section 35 may be added as a new block, or may be added to the display operations block 34.

Figure 14:
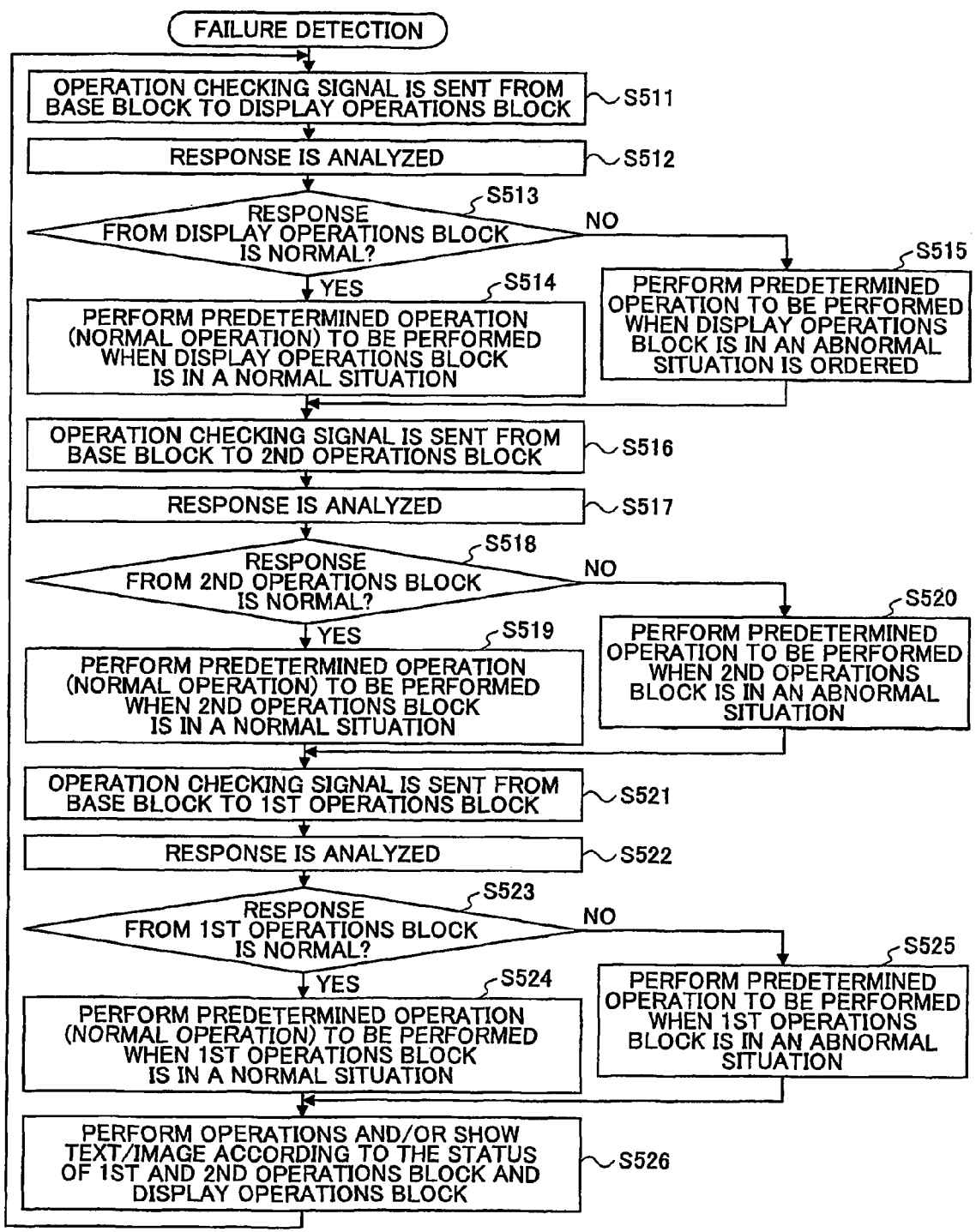
FIG. 14 is a flowchart showing an example of failure detection processing performed in an operations panel.

The following describes an example of failure detection processing performed by the control section 311 of the base block 31 of the operations panel 3 with reference to FIG. 14. FIG. 14 is a flowchart showing an example of the failure detection processing performed in the operations panel 3.

With reference to FIG. 14, an operation checking signal, which indicates predetermined operation checking information for checking operations, is sent from the base block 31 to the display operations block 34 in step S511. In step S512, the control section 311 analyzes a response sent from the display operations block 34 in response to the operation checking signal, and saves the analysis result in the memory section 312 as a status information item of the display operations block 34. Then, the processing proceeds to step S513.

In step S513, the control section 311 determines whether the response from the display operations block 34 is normal based on the analysis result. If the control section 311 determines that the response is normal (Yes in step S513), the control section 311 orders a predetermined operation (normal operation), which is to be performed when the display operations block 34 is in a normal situation, in step S514. Then, the processing proceeds to step S516.

If, on the other hand, the control section 311 determines that the response is not normal (No in step S513), the control section 311 orders a predetermined operation, which is to be performed when the display operations block 34 is in an abnormal situation, in step S515. Then, the processing proceeds to step S516.

In step S516, an operation checking signal, which indicates predetermined operation checking information for checking operations, is sent from the base block 31 to the second operations block 33. In step S517, the control section 311 analyzes a response sent from the second operations block 33 in response to the operation checking signal, and saves the analysis result in the memory section 312 as a status information item of the second operations block 33. Then, the processing proceeds to step S518.

In step S518, the control section 311 determines whether the response from the second operations block 33 is normal based on the analysis result. If the control section 311 determines that the response is normal (Yes in step S518), the control section 311 orders a predetermined operation (normal operation), which is to be performed when the second operations block 33 is in a normal situation, in step S521. Then, the processing proceeds to step S521.

If, on the other hand, the control section 311 determines that the response is not normal (No in step S518), the control section 311 orders a predetermined operation to be performed when the second operations block 33 is in an abnormal situation in step S520. Then, the processing proceeds to step S521.

In step S521, an operation checking signal, which indicates predetermined operation checking information for checking operations, is sent from the base block 31 to the first operations block 32. In step S522, the control section 311 analyzes a response sent from the first operations block 32 in response to the operation checking signal, and saves the analysis result in the memory section 312 as a status information item of the first operations block 32. Then, the processing proceeds to step S523.

In step S523, the control section 311 determines whether the response from the first operations block 32 is normal based on the analysis result. If the control section 311 determines that the response is normal (Yes in step S523), in step S524 the control section 311 orders a predetermined operation (normal operation), which is to be performed when the first operations block 32 is in a normal situation. Then, the processing proceeds to step S526.

If, on the other hand, the control section 311 determines that the response is not normal (No in step S523), the control section 311 orders a predetermined operation, which is to be performed when the first operations block 32 is in an abnormal situation, in step S525. Then, the processing proceeds to step S526.

In step S526, the control section 311 turns on/off the first status display section 35a, the second status display section 35b, and the third status display section 35c based on the corresponding status information items of the first operations block 32, the second operations block 33, and the display operations block 34 held in the memory section 312. Then, the processing returns to step S511 to repeat a series of the operations described above.

In the above embodiment, the control section 311 of the base block 31 functions as a failure detecting unit in the appended claims.

If one or both of the first and second operations blocks 32 and 33 fail, the control section 311 of the base block 31 can also function as an instruction unit that transmits an LCD display switching request for displaying selection items corresponding to the failed operations blocks 32 and/or 33. Thus, even if one or both of the first and second operations blocks 32 and 33 have failed, all the functions of the image forming apparatus 1 can be used as in a normal situation without waiting for repair/replacement of the failed part. Such a configuration facilitates maintenance. If a failure occurs in the second operations block 33 removed so as to be used as a remote controller, all the functions are available from the display operations block 34 remaining on the main body 2.

Figure 15:
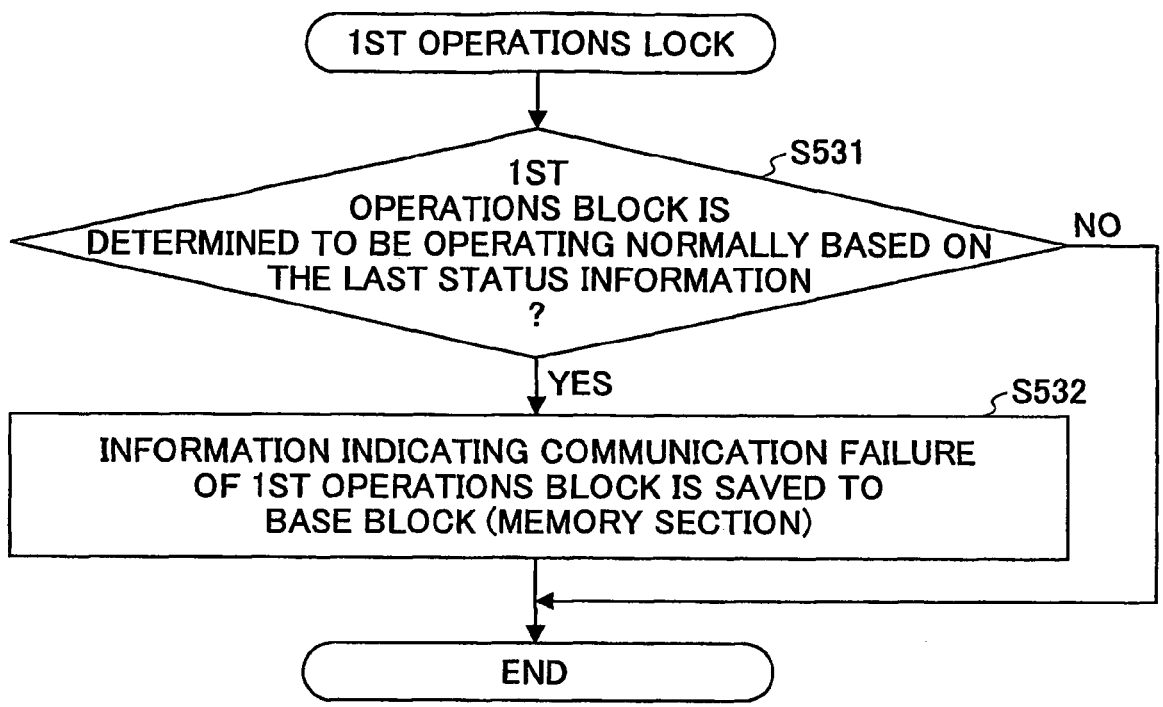
FIG. 15 is a flowchart showing an example of processing performed in an operations panel when a first operations block is in an abnormal situation.

The following describes an example of the processing performed by the control section 311 of the base block 31 of the operations panel 3 when the first operations block 32 is in an abnormal situation with reference to FIG. 15. FIG. 15 is a flowchart showing an example of the processing performed in the operations panel 3 when the first operations block 32 is in an abnormal situation.

With reference to FIG. 15, in step S531, the control section 311 determines whether the first operations block 32 is operating normally based on the last status information item of the first operations block 32 held in the memory section 312. If the control section 311 determines that the first operations block 32 is not operating normally (No in step S531), the processing is terminated. If, on the other hand, the control section 311 determines that the first operations block 32 is operating normally (Yes in step S531), the processing proceeds to step S532.

In step S532, information indicating the cause (low battery level, transmission trouble, etc.) of the communications failure of the first operations block 32 is saved in the memory section 312 of the base block 31. At the same time, the control section 311 reports the failure to the user by turning on the first status display section 35a of the failure display section 35 or by showing a notice indicating the cause of the failure on the LCD 346 of the display operations block 34.

In the flowchart of FIG. 15, if the last status information item is not held in the memory section 312 because, for example, the image forming apparatus 1 has been just started, the processing proceeds to step S532 regardless of whether the first operations block 32 is operating normally.

Figure 16:
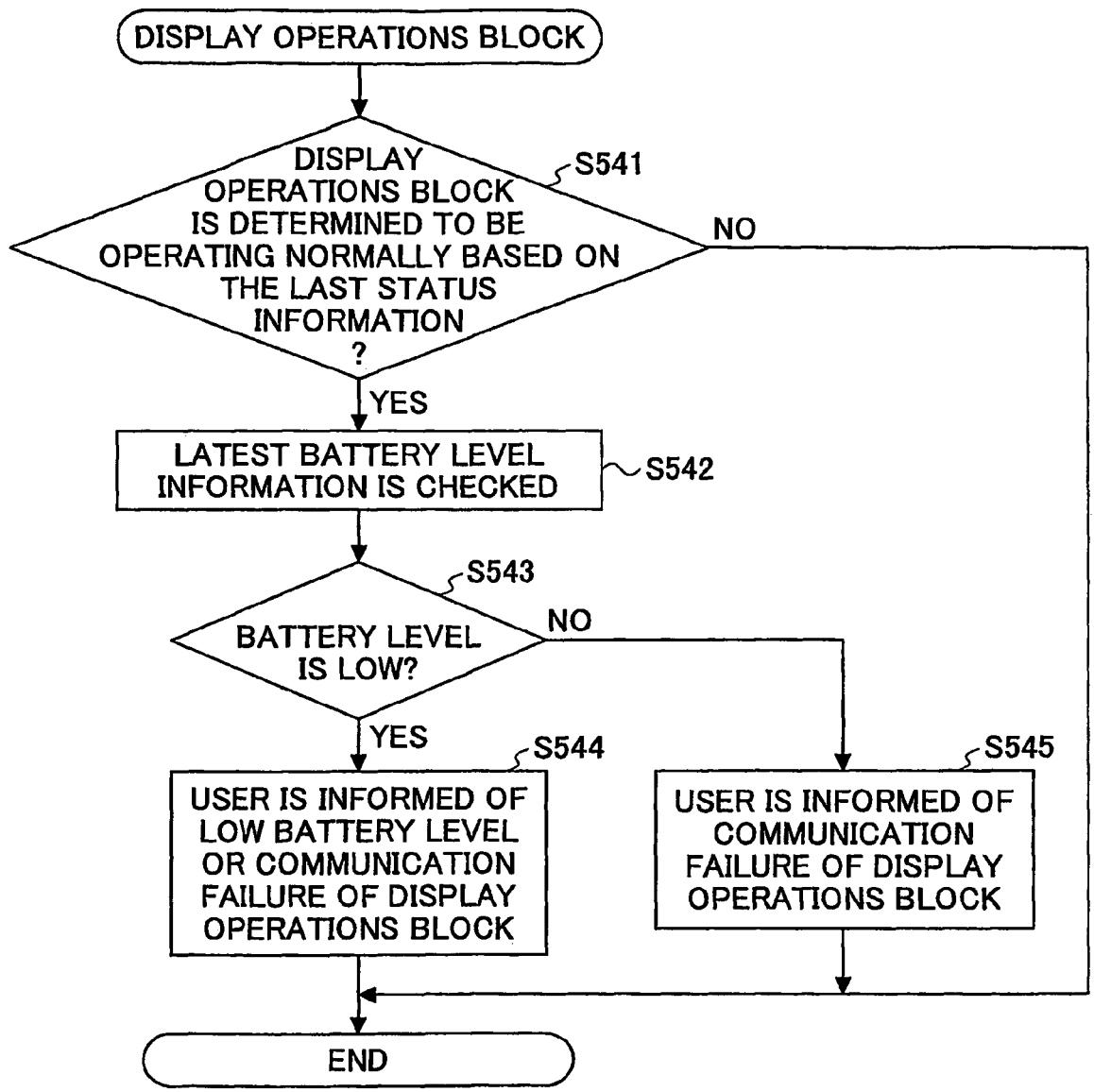
FIG. 16 is a flowchart showing an example of processing performed in an operations panel when a display operations block is in an abnormal situation.

The following describes an example of the processing performed by the control section 311 of the base block of the operations panel 3 when the display operations block 34 is in an abnormal situation with reference to FIG. 16. FIG. 16 is a flowchart showing an example of the processing performed in the operations panel 3 when the display operations block 34 is in an abnormal situation.

With reference to FIG. 16, in step S541, the control section 311 determines whether the display operations block 34 is operating normally based on the last status information item of the display operations block 34 held in the memory section 312. If the control section 311 determines that the display operations block 34 is not operating normally (No in step S541), the processing is terminated. If, on the other hand, the control section 311 determines that the display operations block 34 is operating normally (Yes in step S541), the control section 311 checks the information indicating the latest battery level of the battery 349 of the display operations block 34 held in the memory section 312 in step S542. Then, the processing proceeds to step S543.

In step S543, the control section 311 determines whether the battery level is low. If the control section 311 determines that the battery level is low (Yes in step S543), information indicating that the battery level of the display operations block 34 is low or information indicating the cause (unreadable signals, out of remote control range, etc.) of the communications failure of the display operations block 34 is saved in the memory section 312 of the base block 31 in step S544. At the same time, the control section 311 reports the failure to the user by turning on the third status display section 35c of the failure display section 35 or by showing a notice indicating the cause of the failure on the LCD 346 of the display operations block 34, and terminates the processing.

If the control section 311 determines that the battery level is not low (No in step S543), information indicating the cause (unreadable signals, out of remote control range, etc.) of the communications failure of the display operations block 34 is saved in the memory section 312 of the base block 31 in step S545. At the same time, the control section 311 reports the failure to the user by turning on the third status display section 35c of the failure display section 35 or by showing a notice indicating the cause on the LCD 346 of the display operations block 34, and terminates the processing.

The following describes an example of the processing performed by the control section 311 of the base block 31 of the operations panel 3 when the second operations block 33 is in an abnormal situation with reference to FIG. 17. FIG. 17 is a flowchart showing an example of the processing performed in the operations panel 3 when the second operations block 33 is in an abnormal situation.

With reference to FIG. 17, in step S551, the control section 311 determines whether the second operations block 33 is operating normally based on the last status information item of the second operations block 33 held in the memory section 312. If the control section 311 determines that the second operations block 33 is not operating normally (No in step S551), the processing is terminated. If, on the other hand, the control section 311 determines that the second operations block 33 is operating normally (Yes in step S551), the control section 311 checks information indicating the latest battery level of the battery 339 of the second operations block 33 held in the memory section 312 in step S552. Then, the processing proceeds to step S553.

In step S553, the control section 311 determines whether the battery level is low. If the control section 311 determines that the battery level is low (Yes in step S553), information indicating that the battery level of the second operations block 33 is low or information indicating the cause (unreadable signals, out of remote control range, etc.) of the communications failure of the second operations block 33 is saved in the memory section 312 of the base block 31 in step S554. At the same time, the control section 311 reports the failure to the user by turning on the second status display section 35b of the failure display section 35 or by showing a notice indicating the cause of the failure on the LCD 346 of the display operations block 34, and terminates the processing.

If the control section determines that the battery level is not low (No in step S553), information indicating the cause (signals unreadable by the second operations block 33, out of remote control range, etc.) of the communications failure of the second operations block 33 is saved in the memory section 312 of the base block 31 in step S555. At the same time, the control section 311 reports the failure to the user by turning on the second status display section 35b of the failure display section 35 or by showing a notice indicating the cause on the LCD 346 of the display operations block 34, and terminates the processing.

The following describes an example of processing performed in response to the failure detection processing performed in the operations panel 3 with reference to FIG. 18. FIG. 18 is a table showing a relationship between failures in the operations panel 3, operations, and reports.

The control section 311 of the base block 31 detects failures in the first operations block 32, the second operations block 33, and the display operations block 34 by decoding the responses sent from the first control section 321, the second control section 331, and the third control section 341. Then, the predetermined operations shown in FIG. 18 are performed according to the failures of the operations blocks 32-34 while reporting the failures to the user with the corresponding reporting methods.

For example, if failures are detected in the first operations block 32 and the second operations block 33, selection items corresponding to the first and second operations blocks 32 and 33 are retrieved and displayed on the display operations block 34 as soft keys (see FIG. 4B) such that the functions of the failed first and second operations blocks 32 and 33 can be used from the display operations block 34. The detected failures of the first and second operations blocks 32 and 33 are reported to the user by turning on the first status display section 35a and the second status display section 35b of the failure display section 35 and by displaying a notice on the LCD 346 of the display operations block 34.

If a failure is detected only in the display operations block 34, input from only the hard keys, i.e., the operation keys 327 and 338, of the first operations block 32 and the second operations block 33 are accepted such that basic operations (e.g. operation of making one copy) are available. The detected failure of the display operations block 34 is reported to the user only by turning on the failure display section 35 and the third status display section 35c of the failure display section 35.

With the related-art techniques, if an operations block remaining on the main body 2 fails, the functions of the failed operations block cannot be used. On the other hand, according to the above embodiment of the present invention, if an operations block remaining on the main body 2 fails, the functions of the failed operations block remaining on the main body 2 can be incorporated into the display operations block 34, which is removable to be used as a remote controller, such that all the functions are available from the display operations block 34 as in the normal situations. If the operations block removed to be used as a remote controller fails, the functions of the operations block remaining on the main body 2 can be used.

Moreover, since the failure can be detected at the operations block level, the operations block that requires replacement can be identified. This is favorable for repair persons. This is also advantageous as an appliance.

In related-art multifunction copy machines, the main body control section 21 for controlling the operations of the main body 2 is connected to the control section 311 of the operations panel 3 through a serial or a parallel interface. In order to quickly perform operations, e.g., of switching items or screens shown on the displays such as the LCD 346, in response to input from the operations block, a data rate of at least tens of Mbps or higher is required although the rate may vary depending on the resolution and display area of the displays (e.g. data for one image=500 Kb data, transfer time=0.1 second; 500 KB/0.1)

However, if a wireless interface, such as infrared rays, is used, the data rate is about tens of bps. Therefore, image information cannot be handled. If such a related-art copy machine includes the operations panel 3 of the present invention, workload on the remote controller can be reduced without changing control methods employed in the main body.

In the above embodiments, an ID (identification) may be assigned to each of the operations blocks 32-34 of the operations panel 3 so as to implement an order of priorities. By assigning IDs, two or more operations blocks having the same functions can be used at the same time.

The present application is based on Japanese Priority Application No. 2005-039020 filed on Feb. 16, 2005, with the Japanese Patent Office, the entire contents of which are hereby incorporated by reference.

INDUSTRIAL APPLICABILITY

The operations panel of the present invention can be removably attached to an electronic apparatus, such as an image forming apparatus, and remotely control the electronic apparatus when removed therefrom, while providing improved operability.

The invention claimed is:

1. An operations panel comprising:

a plurality of operations blocks that are attached to a main body of an electronic apparatus, and are used for selecting selection items corresponding to operational functions of the electronic apparatus;

a selection information output unit that outputs a selection information item indicating the selection item selected in the operations block;

a display operations block that is removably attachable to the main body, including a display unit that shows display selection items used for selecting the operational functions, a selection detecting unit that detects the selected display selection item shown by the display unit, and a display control unit that causes the display unit to show the selection items corresponding to the operations blocks together with the display selection item when the display operations block is removed from the main body; and a selection information retrieving unit that retrieves, as the selection information item, a selection result detected by the selection detecting unit of the display operations block removed from the main body;

wherein the selection information output unit outputs the selection information item retrieved by the selection information retrieving unit to the electronic apparatus.

2. The operations panel as claimed in claim 1, wherein the display operations block further includes a selection item retrieving unit that retrieves the selection items corresponding to the operations blocks attached to the main body when the display operations block is removed from the main body; and the display control unit of the display operations block causes the display unit to show the selection items retrieved by the selection item retrieving unit together with the display selection item.

3. The operations panel as claimed in claim 2, further comprising:

a removal detecting unit that detects that the operations block that is removably attachable to the main body is attached to and removed from the main body;

wherein, in response to a detection of a removal of the operations block by the removal detecting unit, the selection item retrieving unit of the display operations block retrieves the selection item corresponding to the removed operations block.

4. The operations panel as claimed in claim 1, further comprising:

an interruption detecting unit that detects an interruption request issued from the operations blocks or the display operations block for suspension of an operation being performed in the electronic apparatus and execution of another operation, based on a selection result in the operations blocks or the display operations block;

a selection information memory unit that stores selection information items indicating selection items selected in the operations blocks, excluding the operations block that has issued the interruption request, or the display operations block in order of time after a detection of the interruption request by the interruption detecting unit; and an interruption completion detecting unit that detects a completion of the interruption request detected by the interruption detecting unit, based on a selection result in the operations block or the display operations block;

wherein the selection information output unit outputs the selection information items stored in the selection information memory unit to the electronic apparatus in order of time in response to a detection of the completion by the interruption completion detecting unit.

5. The operations panel as claimed in claim 1, further comprising:

a failure detecting unit that detects occurrence of failures in the operations blocks; and an instruction unit that specifies, for the display control unit of the display operations block, the selection item corresponding to the operations block in which occurrence of a failure is detected by the failure detecting unit;

wherein the display control unit of the display operations block causes the display unit to show the selection item specified by the instruction unit together with the display selection item.

6. The operations panel as claimed in claim 5, wherein the display control unit of the display operations block causes the display unit to show a failure information item indicating the operations block in which the occurrence of the failure is detected by the failure detecting unit.

7. The operations panel as claimed in claim 5, wherein the failure detecting unit sends, to the operations block, an operation checking information item for checking whether the operations block is operating normally, and detects the occurrence of the failure based on a response information item received from the operations block in response to the sent operation checking information item or based on whether a response to the sent operation checking information item is received.

8. The operations panel as claimed in claim 5, wherein the display control unit of the display operations block causes the display unit to not show the selection item corresponding to the operations block in which the occurrence of the failure is detected by the failure detecting unit when the display operations block is removed from the main body.

9. An image forming apparatus comprising:

the operations panel of claim 1;

wherein image forming processing is performed according to the selection information item output from the operations panel.

* * * * *